United States Patent [19]
Hotchkin

[11] Patent Number: 5,727,218
[45] Date of Patent: Mar. 10, 1998

[54] CONTROLLING AN APPARATUS DISPOSED FOR ADAPTING FIBER CHANNEL TRANSMISSIONS TO AN INDUSTRY STANDARD DATA BUS

[75] Inventor: Glenn Thomas Hotchkin, Mission Viejo, Calif.

[73] Assignee: Unisys Corp., Blue Bell, Pa.

[21] Appl. No.: 611,141

[22] Filed: Mar. 5, 1996

[51] Int. Cl.$^6$ ................................ G06F 13/00
[52] U.S. Cl. ................................ 395/733
[58] Field of Search ................ 395/733, 200.09, 395/200.01, 309, 441

[56] References Cited

U.S. PATENT DOCUMENTS

| | | | |
|---|---|---|---|
| 5,309,563 | 5/1994 | Farrand et al. | 395/200.01 |
| 5,355,453 | 10/1994 | Row et al. | 395/200.09 |
| 5,440,716 | 8/1995 | Schultz et al. | 395/441 |
| 5,561,806 | 10/1996 | Fitchett et al. | 395/800 |
| 5,621,902 | 4/1997 | Cases et al. | 395/309 |
| 5,623,697 | 4/1997 | Bland et al. | 395/309 |

Primary Examiner—Ayaz R. Sheikh
Attorney, Agent, or Firm—J. Ronald Richebourg; Mark T. Starr; Steven R. Petersen

[57] ABSTRACT

The present invention operates in a file server having a peripheral storage subsystem coupled thereto by means of a fibre channel. The file server includes an apparatus disposed between the file server and the storage subsystem for adapting fibre channel transmissions to and from an industry standard data bus of the file server. The apparatus includes a microprocessor executing a method comprising the following steps. Sensing if an interrupt has occurred by the file server, and if so, determining the condition of the interrupt by the file server and handling it. If an interrupt has not occurred, testing an interface between the fibre channel and the apparatus to assure connectivity of the fibre channel. Next, sense for an action to be taken in response to the interrupt, and if so attempt to take appropriate action. If no action is to be taken, sense if an action is to be taken for communications with the file server, and if so, attempt to take the appropriate action, and if not; sense if a previously queued mailbox action is pending, and if so, check to determine if the doorbell register is empty, and if so load the mailbox registers and the doorbell register. If no action is pending, sense if an interrupt has occurred on the fibre channel. If an interrupt has occurred, determine the condition of the interrupt and handle it. Continually repeat all of the previous steps hereof.

18 Claims, 11 Drawing Sheets

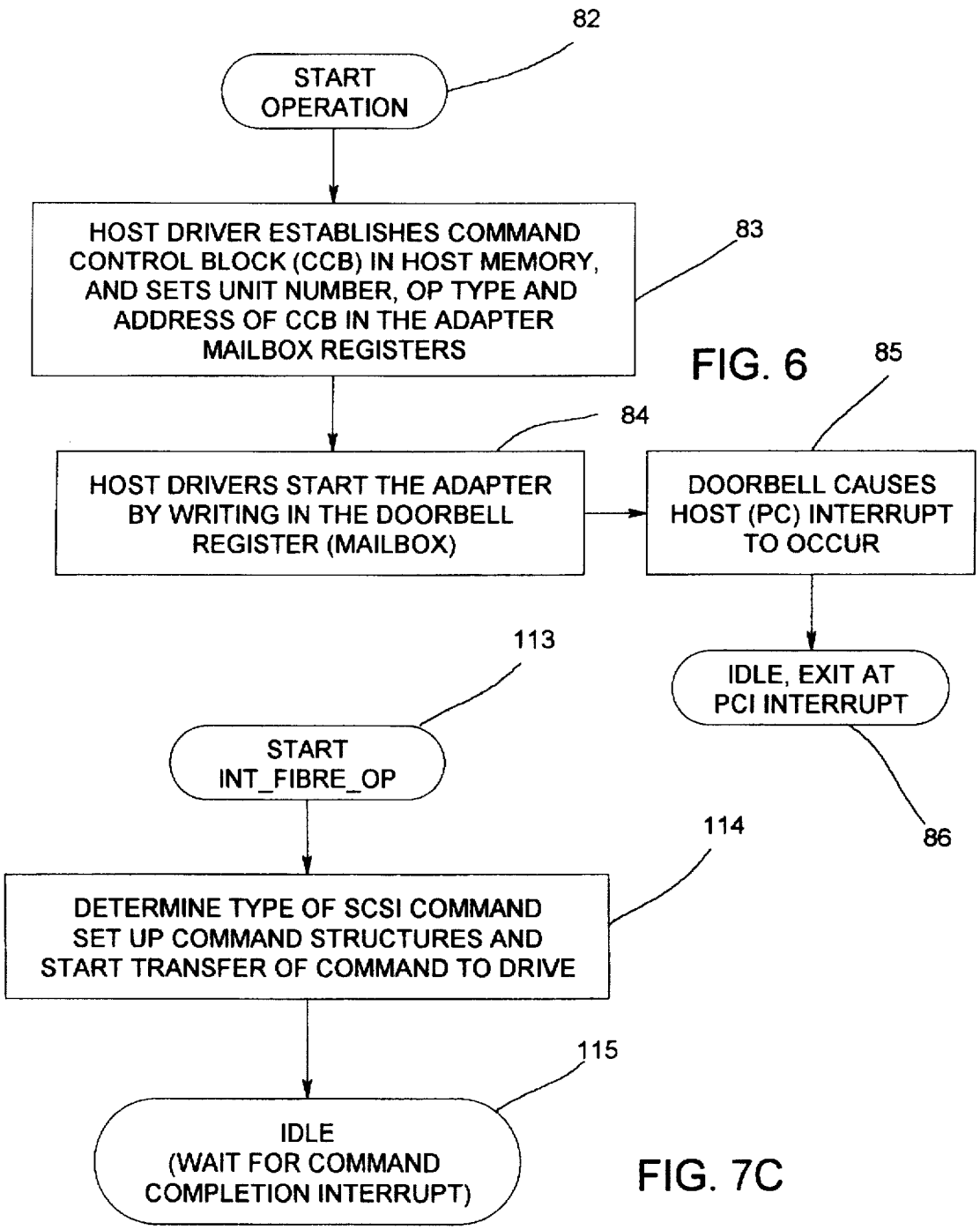

CONTROLLING AN APPARATUS DISPOSED FOR ADAPTING FIBER CHANNEL TRANSMISSIONS TO AN INDUSTRY STANDARD DATA BUS

FIELD OF THE INVENTION

The present invention generally relates to fibre channel transmission conversions, and more particularly to a method for controlling an electronic apparatus that provides an interface connection between an industry standard Peripheral Component Interconnect ("PCI") bus and a very high speed serial channel, which is referred to herein as a Fibre Channel.

BACKGROUND OF THE INVENTION

Greater demands are being made in architecture, performance and implementation across the entire spectrum of computer systems, from supercomputers to PC's. Such demands are dictated by emerging data-intensive applications that require extremely high data rates. Demands for greater interconnection flexibility are also being made. Today, high-performance workstations and intelligent mass storage systems are providing an alternative to the supercomputers used for such data-intensive applications of the past.

It is not uncommon today to cluster a number of workstations together, each operating independently, and linking them to mass storage and display subsystems. Moreover, desktop workstations need to access supercomputers from a distance, such as from a nearby building or from across the street. Such developments are bringing about fundamental changes in the way that high-performance computers and peripherals need to be connected. Computers are becoming faster and capable of handling larger amounts of data. However, the network interconnects between computers and I/O devices are not keeping pace and are not able to run at the high speeds necessary.

Many systems applications face a communications and I/O bottleneck, which is the result of the limited transmission speed of the prior art interconnect technologies. Fibre channel interconnects can help alleviate this problem by providing cost effective, high-speed interconnects between clustered workstations and massive, intelligent storage systems.

For example, a prior art fast SCSI parallel link from a disk drive to a workstation can transmit data at 160 megabits/sec, but it is restricted in length and requires the disk drive to be located no more than a few feet from the computer. In contrast, a quarter-speed Fibre Channel link transmits information at 200 megabits/sec over a single, compact optical cable pair up to 10 kilometers in length. It is noted that full speed Fibre Channel links transmit information at 800 Megabits/second.

Note that the term "fibre" is used herein as a generic term, which can indicate either an optical or a metallic cable. Fibre channel is the general name of an integrated set of standards being developed by the American National Standards Institute (ANSI) which defines new protocols for flexible information transfer.

SUMMARY OF THE INVENTION

It is therefore an object of the present invention to provide a unique method for controlling an apparatus that has high-bandwidth utilization with distance insensitivity, and that supports multiple cost/performance levels, from small systems to supercomputers.

Yet another object of the method of the present invention is to provide the ability to carry multiple existing interface command sets, while preserving current driver software.

The present invention operates in a file server having a peripheral storage subsystem coupled thereto by means of a fibre channel. The file server includes a memory and an apparatus disposed between the file server and the storage subsystem for adapting fibre channel transmissions to and from an industry standard data bus of the file server. The apparatus includes an interface logic having a doorbell register and mailbox registers, a buffer memory, a fibre channel controller and a microprocessor executing a method comprising the following steps. Sensing if an interrupt has occurred by the file server, and if so, determining the condition of the interrupt by the file server and handling it. If an interrupt has not occurred, testing an interface between the fibre channel and the apparatus to assure connectivity of the fibre channel. Next, sense for an action to be taken in response to the interrupt, and if so attempt to take appropriate action. If no action is to be taken, sense if an action is to be taken for communications with the file server, and if so, attempt to take the appropriate action, and if not; sense if a previously queued mailbox action is pending, and if so, check to determine if the doorbell register is empty, and if so load the mailbox registers and the doorbell register. If no action is pending, sense if an interrupt has occurred on the fibre channel. If an interrupt has occurred, determine the condition of the interrupt and handle it. Continually repeat all of the previous steps hereof.

The foregoing and other objects, features and advantages of this invention will become apparent from the following more particular description of a preferred embodiment of the invention, as illustrated in the accompanying drawings in which like reference numerals refer to the same components throughout the different views. The drawings are not necessarily to scale, emphasis instead being placed upon illustrating the principles of the invention.

BRIEF DESCRIPTION OF THE DRAWINGS

FIG. 6 is a flow chart of a sample command flow, which is begun within the host PC.

FIG. 7C is a flow chart that illustrates the building of structures for the fibre channel controller to execute a command.

DESCRIPTION OF ONE EMBODIMENT

Figure 1:
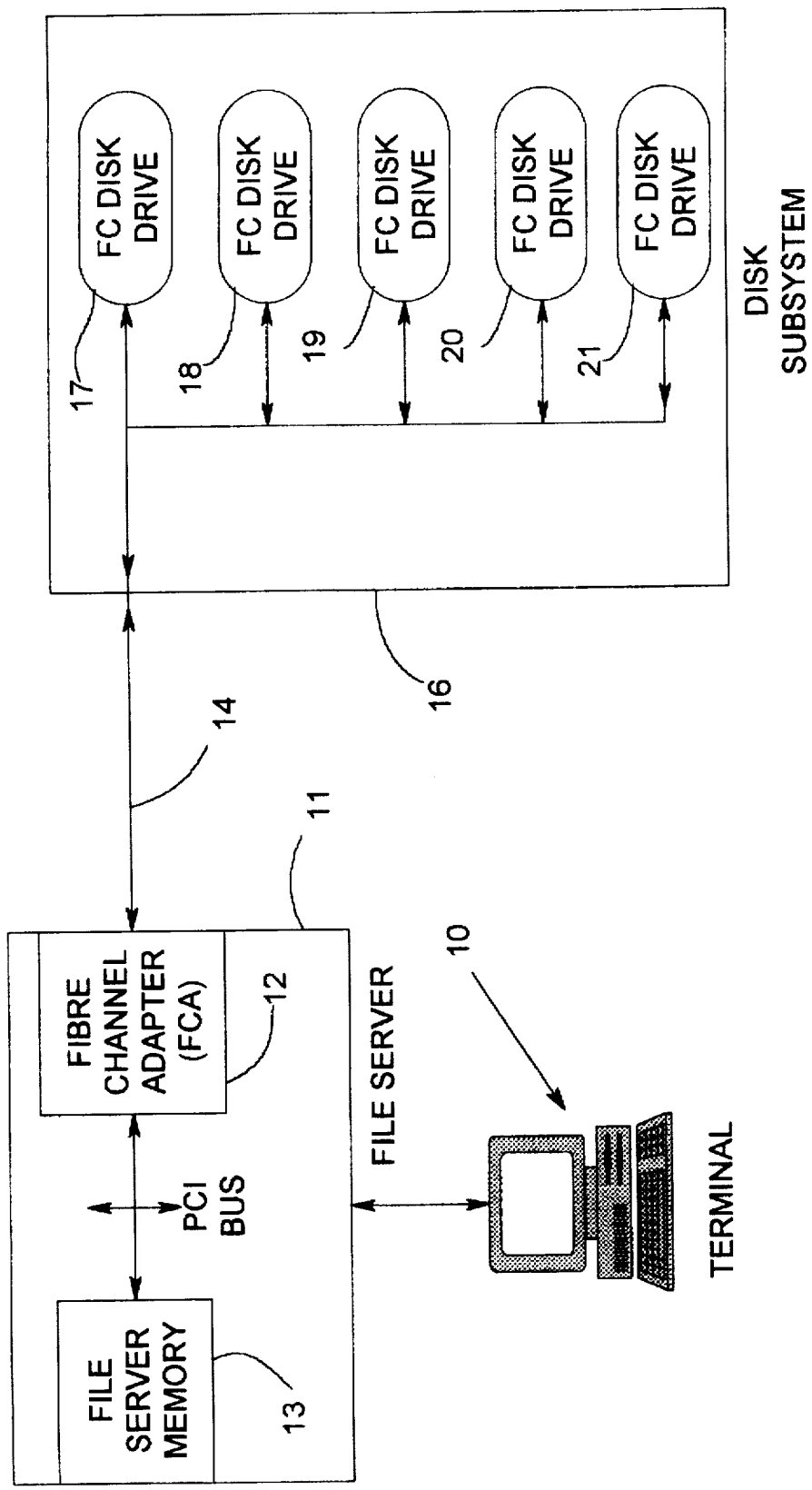
FIG. 1 is an overall block diagram of a system including the fibre channel apparatus that executes the method of the present invention.

Referring now to FIG. 1, an overall block diagram of a system employing the present invention is shown wherein a terminal 10 is coupled to a file server 11, which is sometimes referred to herein as a PC (personal computer). The file server 11 includes a fibre channel adapter (FCA) 12, which executes the method of the present invention, and a memory 13. The FCA 12 is coupled to a fibre channel 14 having another end thereof coupled to a disk subsystem 16. The disk subsystem 16 includes fibre channel compatible disk drives 17 through 21, and each disk drive includes a translator buffer (not shown). The translator buffers encode a 10-bit coded stream of data into 8 bits of raw data.

Figure 2:
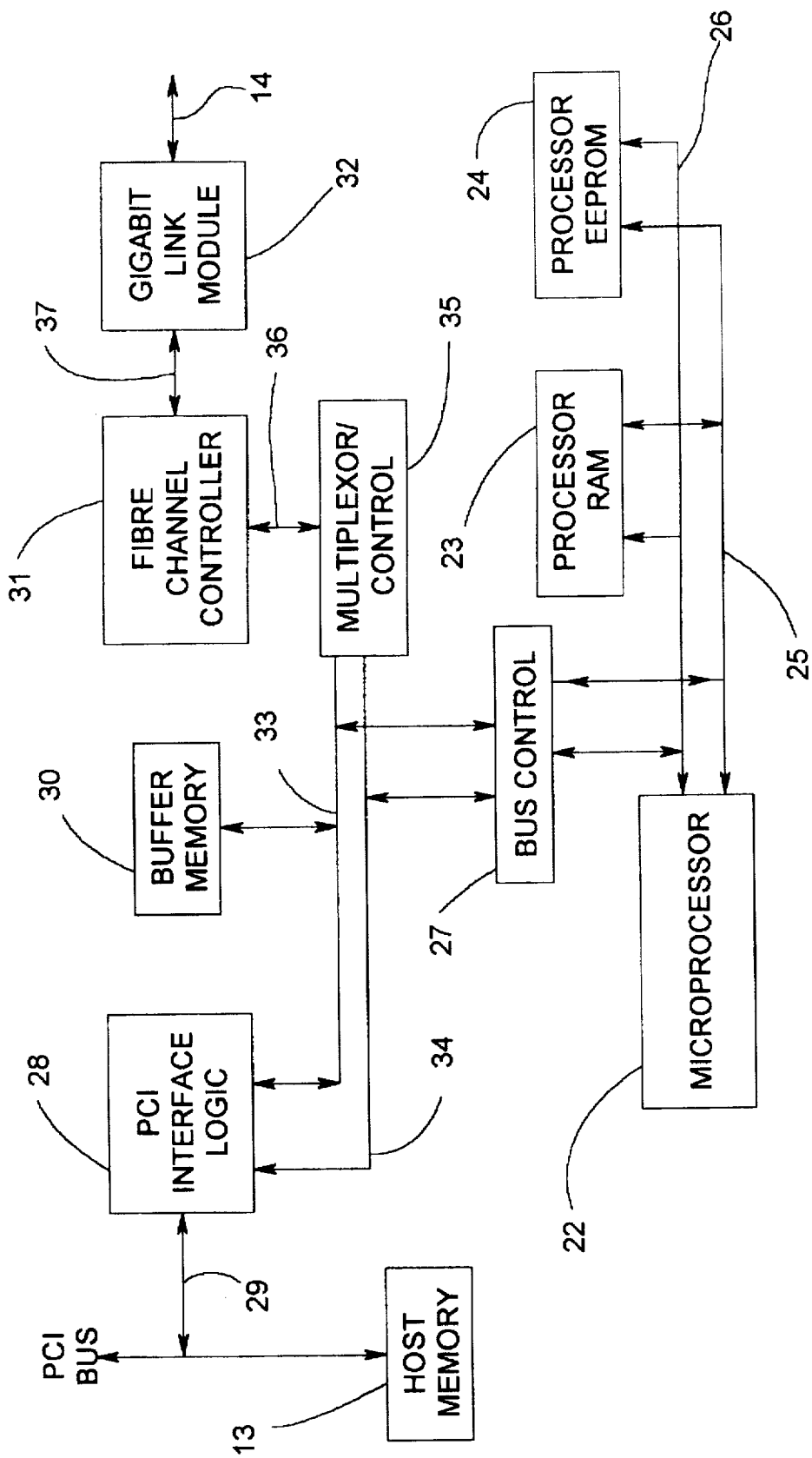
FIG. 2 is a block diagram of the fibre channel apparatus executing the method of the present invention.

With reference to FIG. 2, the apparatus implementing the method of this invention is illustrated in block diagram form and is divided into two sections: a processor section (bottom half of the drawing) and a local bus section (top half of the drawing). The processor section includes a microprocessor 22 (also referred to herein as processor 22), a RAM 23 used as an instruction memory, an EEPROM 24 used as a flash memory, an address bus 25 and a data bus 26 (which is sometimes collectively referred to herein as processor bus 25/26). In one embodiment that was built, an Intel 80960 was used as the microprocessor 22, which is available from Intel Corporation, Santa Clara, Calif. Reference is made to a text book entitled "Microcontrollers" by Kenneth Hintz and Daniel Tabak for applications, and techniques in programming microprocessors, such as the Intel 80960.

The local bus section includes the local bus controller 27 (which is also coupled to the processor bus 25/26), a PCI bus interface logic 28 (which is also coupled to a PCI bus 29), a buffer memory 30 and a fibre channel (or "FC") controller 31. A gigabit link module 32 ("GLM") is coupled between the fibre channel 13 and the FC controller 31 by means of a parallel data bus 37. A local bus, comprising a data bus 33 and an address bus 34 (hereinafter sometimes collectively referred to as local bus 33/34), connects the bus control 27 with the PCI interface logic 28 and the buffer memory 30. The local bus 33/34 is the path for moving data between the buffer memory 30 and the devices on the fibre channel 13 via a multiplexor/control 35, the FC controller 31 and the GLM 32. The processor 22 has access to the local bus 33/34 for communication with the resources connected thereto.

Selection of the processor bus 25/26 for use by the processor 22 to communicate with its resources is by means of an address region decode. The processor 22 divides its four gigabyte address space into sixteen 256 Mbyte regions using the four most significant address bits. Additionally, the fifth most significant address bit is used to select the upper or lower half of a region within the buffer memory 30. The following table illustrates the memory map for the microprocessor used in one embodiment.

MEMORY MAP
(ADDRESS RANGE FOR REGIONS)

| RESERVED 960 INTERNAL RAM | 00000000 000003FF |
|---|---|
| PCI REGISTERS | 08000000 08000133 |
| RESERVED EXPANSION ROM | 10000000 1FFFFFFF |
| PCI HOST MEMORY | 20000000 2FFFFFFF |
| DATA BUFFER (512 KB) | 90000000 (B0000000) 9007FFFF (B007FFFF) |
| TACHYON REGISTERS (WORD ONLY) | A0000000 A00001EC |
| CONTROL REGISTERS (WORD ONLY) | D0000000 D000003C |
| CONTROL STORE (512 KB) | E0000000 E007FFFF |
| FLASH MEMORY (256 KB) | FFFC0000 FFFFFFFF |

The processor 22 is isolated from the local bus 33/34 to improve performance. Since the microprocessor 22 is the only bus master on the processor bus 25/26, instruction fetches and "data" transfers to the control store 24 are free of contention from local bus 33/34 activity. When access to one of the resources on the local bus 33/34 is required, the processor 22 becomes one of three bus masters arbitrating for use of the local bus 33/34. The bus control 27 (which is a PLD) controls accesses to the local bus 33/34 and attempts to provide "fair" access to each of the three bus masters by using a least-recently-used arbitration scheme. The bus control 27 does not provide control of bus latency. Once an agent becomes the bus master, its length of ownership and therefore the latency for other agents, is determined by the type of transfer and programmable parameters (under microcode control), as well as access to the PCI bus 29. Resources on the processor bus 25/26 are not accessible by a PCI bus master or local bus master. When granted access to the local bus 33/34, the processor address bus 25 is driven onto the local address bus 34 by means of tri-state drivers, and the processor data bus 26 is extended to the local data bus 33 by means of tri-state transceivers. In one embodiment that was built, the bus control 27 includes a programmable logic device (PLD), such as a Mach 445 manufactured by Advanced Micro Devices, Inc., of Sunnyvale, Calif. The PLD within the bus control 27 is programmed in accordance with the program set forth in Appendix A hereof.

By means of the local bus 33/34, the processor 22 has access to the buffer memory 30, registers within the PCI interface logic 28, and registers within the FC Controller 31 and other agents coupled to the PCI bus 29. Each of these resources is defined as a separate processor region and the characteristics of those address regions are detailed in memory configuration registers of the processor (which are loaded by the microcode stored therein).

The multiplexor/control 35 contains bi-directional registers and buffers and a programmable logic device ("PLD"), which has two major functions. First, the FC controller 31 has a multiplexed (i.e., shared address and data) I/O bus 36. The multiplexor/control 35 controls the separation and merging of the bus 36 with the local bus 33/34, depending upon the direction of data flow and upon which bus master (i.e., processor 22, PCI interface logic 28 or FC controller 31) is in control. The PLD receives information from the bus master and generates signals that control the bi-directional registers and buffers which carry out the separation/merging of the bus 36 with the local bus 33,34. Also, the PLD converts control signals from the bus master to signals understood by the target device (e.g., the buffer memory 30), or one of the other bus masters (e.g., processor 22 or PCI interface logic 28). The PLD within the multiplexor/control 35 in one embodiment that was built employs a Mach 220, which is available from Advanced Micro Devices, Inc. of Sunnyvale, Calif. This PLD is programmed in accordance with the program set forth in Appendix B hereof.

When the FC controller 31 is the bus master, it can provide a single address followed by up to eight words of data. The intent of this operation is to read/write data at the original address, and the following seven sequential addresses. Other elements in the design require an address for each word of data. The PLD contains a counter that stores and increments the original address supplied by the FC controller 31.

By using the local bus 33/34, each of the three bus masters (the processor 22, the PCI interface logic 28, and the FC controller 31) has access to several resources. The processor can extend its data bus 25 to the local bus 33/34 by means of the bus control logic 27 to gain access to registers within the PCI interface logic 28; PCI memory 13, registers within the FC controller 31, as well as the buffer memory 30. A PCI bus master can access registers within the PCI interface logic 28; buffer memory 30, and the internal registers within the FC controller 31. Additionally, the FC controller 31 can access the internal registers of the PCI Interface Logic 28, PCI memory 13 or buffer memory 30.

A PCI bus master can communicate with the processor 22 via mailbox and doorbell registers which are part of the PCI Interface Logic 28, or by transferring information to a designated area in the buffer memory 30.

The FC controller 31 manages the protocol for sending and receiving information on the fibre channel 14. To achieve this, the processor 22 and the FC controller 31 share data structures and data buffers that are maintained in the buffer memory 30. The FC controller 31 provides a connection between the GLM 32 and local bus 33/34 via the address/data bus 36 and the multiplexor/control 35.

The processor 22 can access the buffer memory 30 by using either addresses in processor region 9 or 11; wherein the memory configuration registers define region 9 as little endian and region 11 as big endian. The term "endian" refers to the sequence in which a multi-byte word is transferred. For example, "little endian" means that the least significant byte is transferred first with the most significant byte being transferred last. The term "big endian" refers to the transfer of the most significant byte first, etc. This allows the processor to move information between two locations in the buffer memory (potentially the same location) and change the byte ordering at the same time. This ability to change endianess, by reading from one region and writing to another is useful when dealing with commands or status information. It is also useful when reading from or writing to disk drives that may be formatted differently.

A specific example of endianness occurs at the PCI interface logic 28. The PCI bus is in little endian format and the FC controller 31 assumes/supplies data in big endian format. In order to provide compatible data between the two systems, a byte swap is performed at the PCI interface 28 to the local bus 33/34. Thus, the PCI interface logic 28 provides the PCI bus 29 to local bus 33/34 interface. The logic 28 can function as either a bus master or target on both the PCI 29 and the local bus 33/34. In one embodiment a PCI 9060, which is available from PLX Technology, Inc. of Mountain View, Calif., was used for the logic 28. The PCI 9060 has four sets of internal registers and operates in three modes: The register access mode, the DMA mode and the Pass-Through mode.

The buffer memory 30 may comprise a 512 KB by 9 block of SRAM and is accessible by the local bus 33/34. It serves several purposes: first it contains queues which are common to the microprocessor 22 and the FC controller 31; second, it can be used for temporary data storage and it can be used for communication between the PCI interface logic 28 and the microprocessor 22.

In one embodiment, an HP Tachyon chip, which is available from Hewlett Packard Company of Palo Alto, Calif., was used for the FC Controller 31. This chip performs as an interface between the GLM 32 and the multiplexor control 35. For this function it uses internal configuration registers, and operates from queues maintained in the buffer memory 30. On the GLM interface side, 8 bits of raw data are encoded into 10 bit code words for transmission purposes. This encoding scheme is described by Widner et al in "A DC Balanced Partitioned Block, 8B/10B Transmission Code" in the IBM Journal of Research and Development, Volume 27, 1983, pp 446–451. The purpose for this encoding is to maximize the number of binary data transmissions. The high transmission data rate improves the ability of the receiver to stay locked in synchronism with the transmitter. A decoding operation is performed on receipt of 10 bit code words to 8 bit data bytes.

The FC Controller 31 also implements a protocol for organizing data frames of the code words for transmitting and receiving, which protocol is disclosed in U.S. Pat. No. 5,260,933, entitled ACKNOWLEDGMENT PROTOCOL FOR SERIAL DATA NETWORK WITH OUT-OF-ORDER DELIVERY, by G. L. Rouse. The Fibre Channel Specifications used in building one embodiment of the present invention include the following ANSI Standards:

| Fibre Channel FC-PH Physical & Signaling Interface | X3T11/Project 755D | Rev. 4.3 |
|---|---|---|
| Fibre Channel FC-AL Arbitrated Loop | X3T11/Project 960D | Rev. 4.5 |
| Fibre Channel FCP Protocol for SCSI | X3T10/ X3.2 69- 199X | Rev. 012 |

Figure 3A:
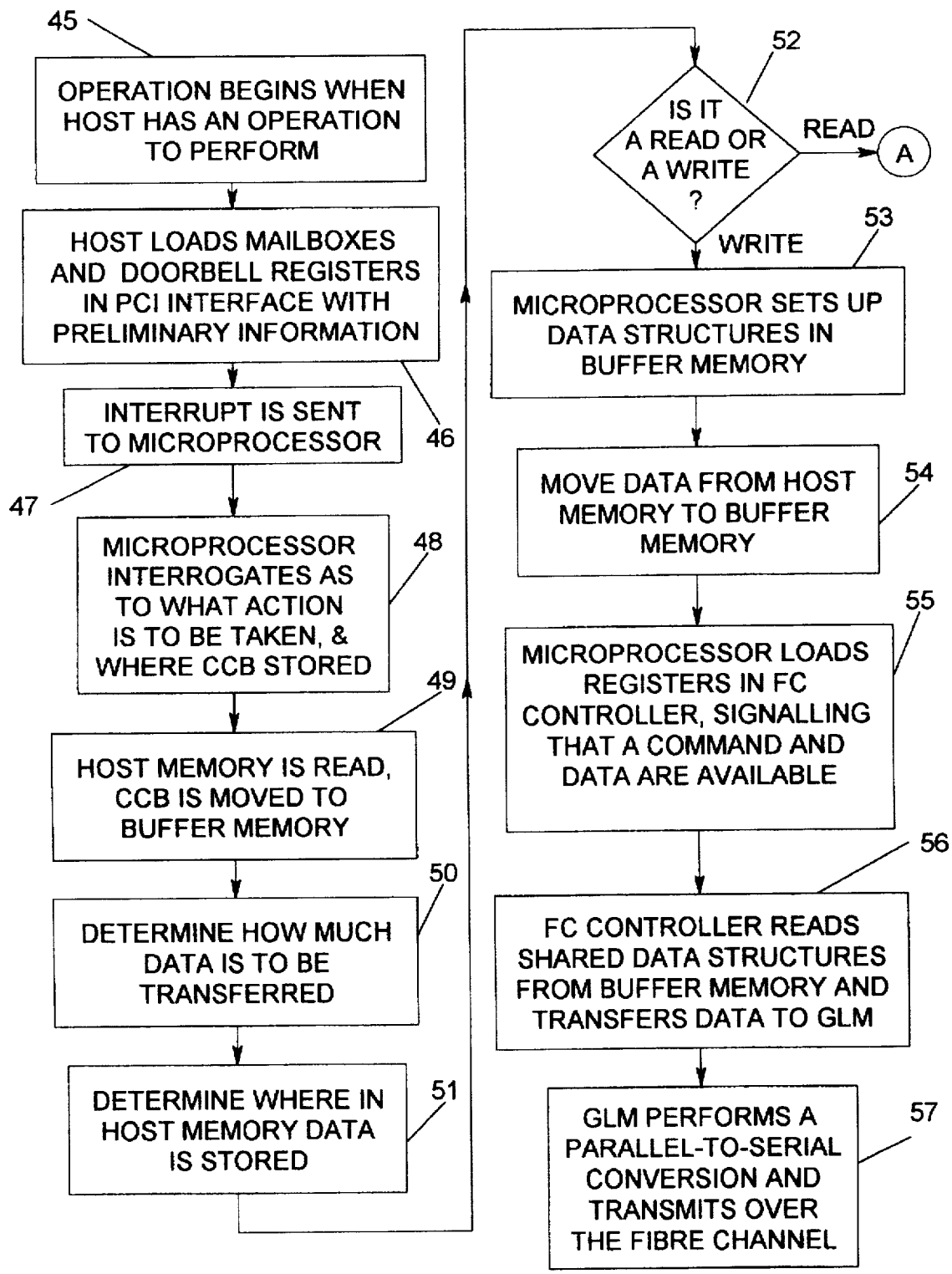
FIGS. 3A and 3B combined form a flow chart that illustrates the sequence of steps performed in operation of the fibre channel apparatus.
Figure 3B:
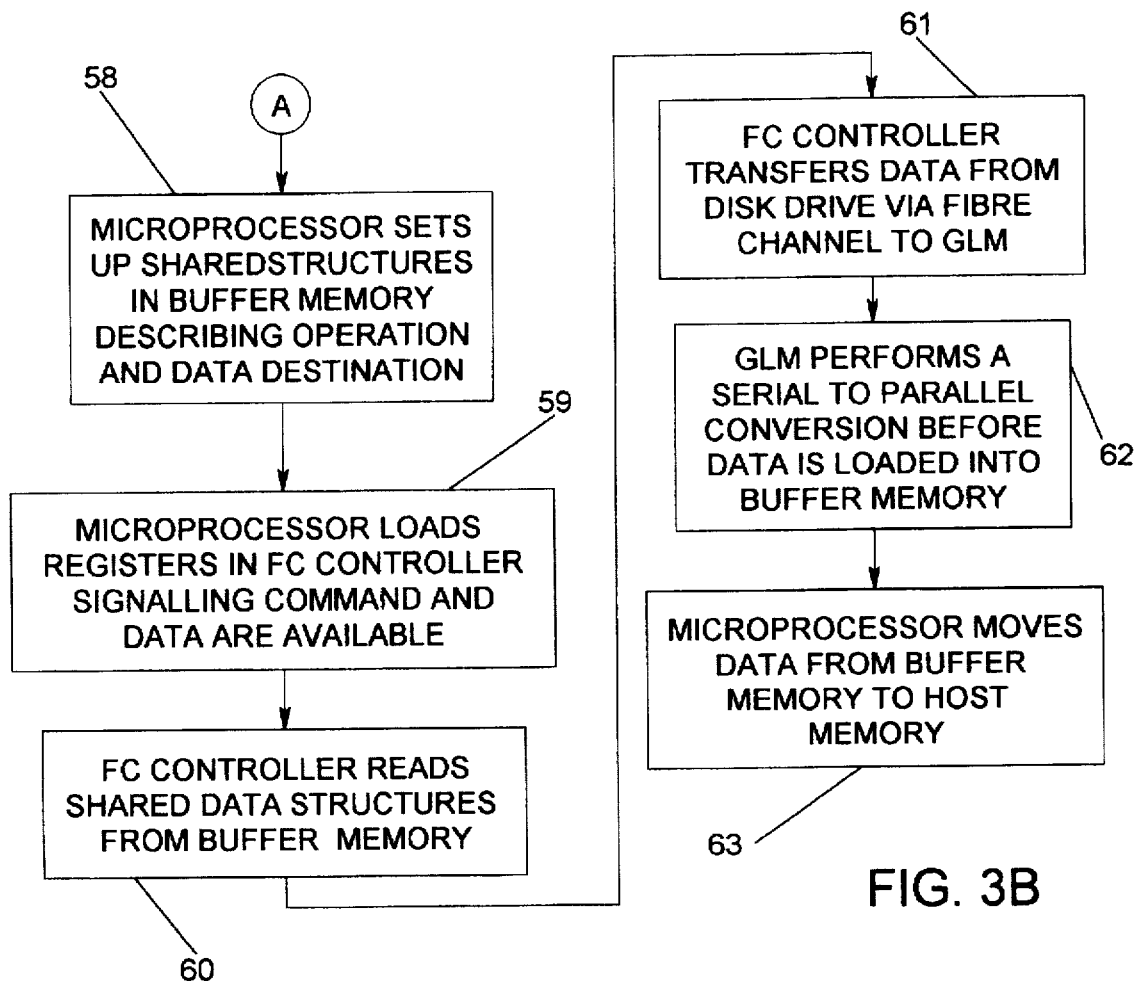

In summary, the operation of the fibre channel apparatus described thus far is illustrated in FIGS. 3A and 3B. The sequence begins when the host (i.e., the file server 11) has an operation to perform (as depicted by a block 45). The driver (host code) writes preliminary information into the mailboxes and doorbell registers, which are part of the PCI interface logic 28 (block 46). The act of writing to the doorbell register causes an interrupt to the microprocessor 22 to be generated (block 47). Next, the microprocessor 22 interrogates the information in the mailboxes to determine what action is required, to what device and where in the host memory 13 a command control block (CCB) is stored (block 48). Using a direct memory access (DMA) controller, which is part of the PCI Interface Logic 28, the processor 22 moves the CCB from the host memory 13 to the buffer memory 30 (block 49). From codes within the CCB, the processor 22 determines what operation is to be performed (i.e., is it a write or a read operation), how much data is to be transferred (block 50), and where in the host memory 13 data is located (for a write operation) or to be stored (read operation) (block 51).

At this juncture, it is determined if the command is a read or a write operation (decision diamond 52). For a write data operation, the processor 22 sets up shared data structures in the buffer memory 30 (block 53), which describes the operation and the data location for the FC Controller 31. Using the DMA controller within the PCI Interface Logic 28, the processor 22 moves the write data from the host memory 13 to the buffer memory 30 (block 54), and then informs the FC Controller 31 that a command and data are available by writing to registers within the FC Controller 31 (block 55). In preparation for the data transfer, the FC Controller 31 reads the shared data structures from the buffer memory 30, and then transfers data from the buffer to the GLM 32 (block 56), which performs a parallel to serial conversion (block 57). The data is subsequently transmitted over the Fibre Channel 14 to a disk drive for storage.

For a read data operation, a branch is taken from the diamond 52 to the flow chart illustrated in FIG. 3B as denoted by a connector "A". The processor 22 sets up shared structures in the buffer memory 30 that describe the operation and data destination for the FC controller 31 (block 58); and, then informs the FC Controller that a command is available by writing to registers therein (block 59). In preparation for the data transfer, the FC Controller 31 reads the shared data structures from the buffer memory 30 (block 60), and then transfers data from a disk drive over the fibre channel 14 via the GLM 32 (block 61) (which performs a serial to parallel conversion-block 62) to the buffer memory 30. Using the DMA controller within the PCI Interface Logic 28, the processor 22 directs moving of the read data from the buffer memory 30 to the host memory 13 (block 63).

Figure 4:
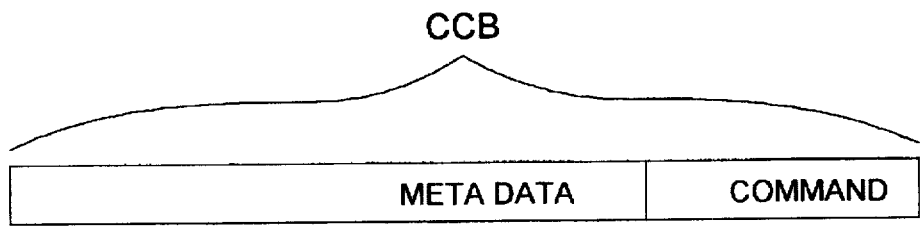
FIG. 4 is a diagram of a typical command control block (CCB).

FIG. 4 illustrates the organization of the command control block (CCB) into a command part and meta data (information about data) part, such as the location of the data in the host memory 13, for example, and the length of the data block.

Figure 5:
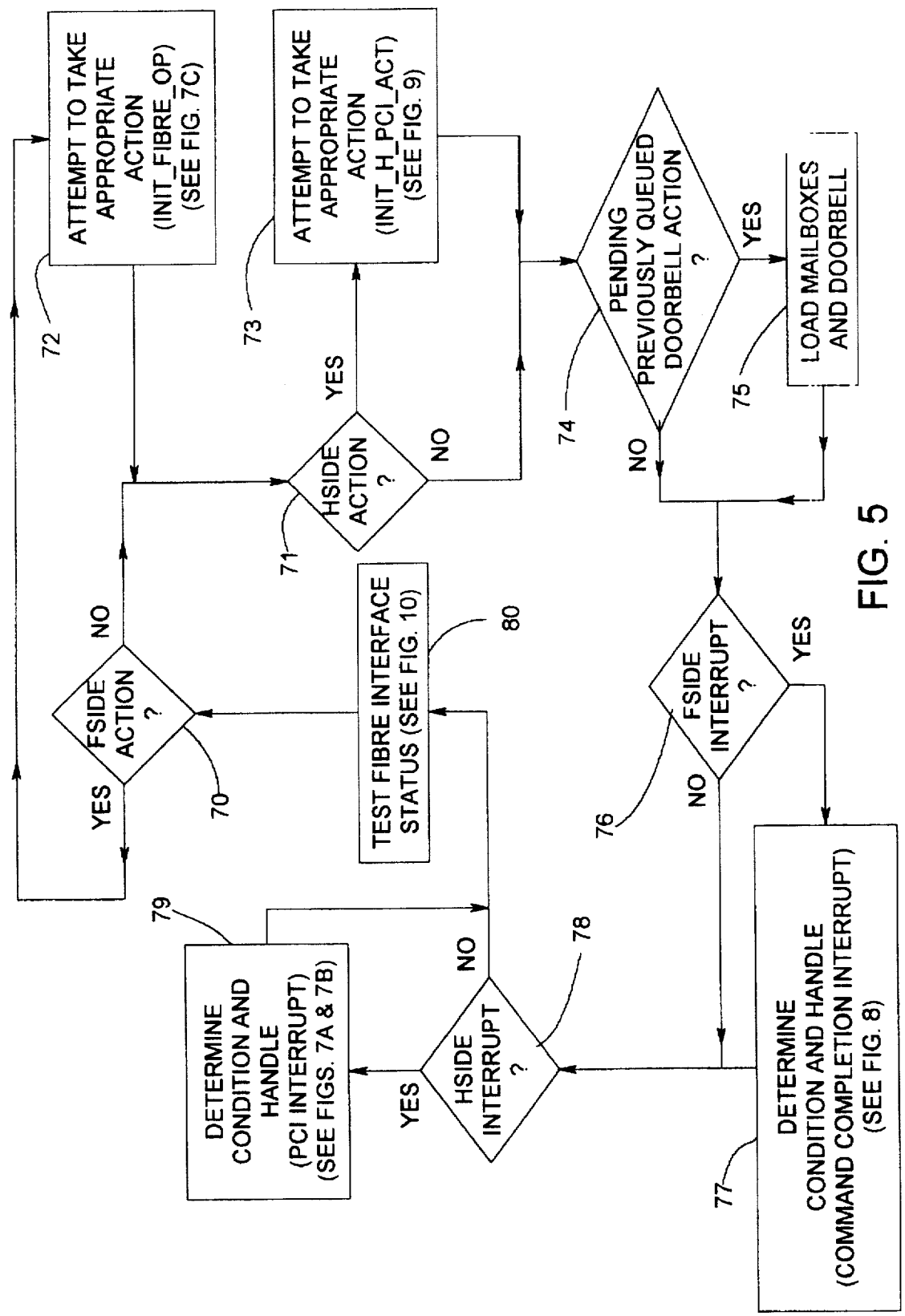
FIG. 5 is an overall flow chart of the method of the present invention, and in particular the idle routine of the microprocessor within the fibre channel apparatus.

Referring now to FIG. 5, an overall flow chart of the method of the present invention is shown, including an idle routine, which routine is part of the C code or program running in the microprocessor 22. In general, this loop is a representation of the CPU looking for something to do. When an interrupt occurs, an action is taken. Beginning with a decision diamond 70, an inquiry is made as to whether or not this is an FSIDE action, i.e. fibre channel action. If not, a branch is taken to another decision diamond 71 where an inquiry is made as to whether or not this is an HSIDE action, i.e. host action. On the other hand, if the answer to this inquiry is yes, then an attempt is made to take appropriate action (block 72—See FIG. 7C). Once this step has been completed then a branch is taken back to the idle loop at the diamond 71. If the answer to the inquiry in the diamond 71 is yes, then an attempt is made to take appropriate action (block 73—See FIG. 9).

If on the other hand, the answer to the inquiry in the diamond 71 is no, or once the process step depicted by the block 73 has been completed, then a branch is taken to yet another decision diamond 74 where an inquiry is made as to whether or not there is a pending previously queued doorbell action. Such an action occurs where a check is made to determine whether or not the doorbell was still full when a command was completed. The check is made for when the doorbell is empty to load the flags that could not previously have been loaded. If the answer to this inquiry is yes, then a branch is taken to a process block 75 to load the mailboxes and the doorbell. Once this process step is complete, or if there is no pending mailbox action, then another inquiry is made as to whether or not this is an FSIDE interrupt (diamond 76), i.e. an interrupt from the fibre channel controller 31. If the answer to this inquiry is yes, then a process step of determining the condition and handling it is performed (block 77—See FIG. 8).

Once the condition is determined and handled (block 77) or if the answer to the inquiry in the diamond 76 is no, then a branch is made to yet another decision diamond 78 where an inquiry is made as to whether or not this is an HSIDE interrupt, i.e. an interrupt from the host (via the doorbell register) in the PCI Interface Logic 28.

Figure 7A:
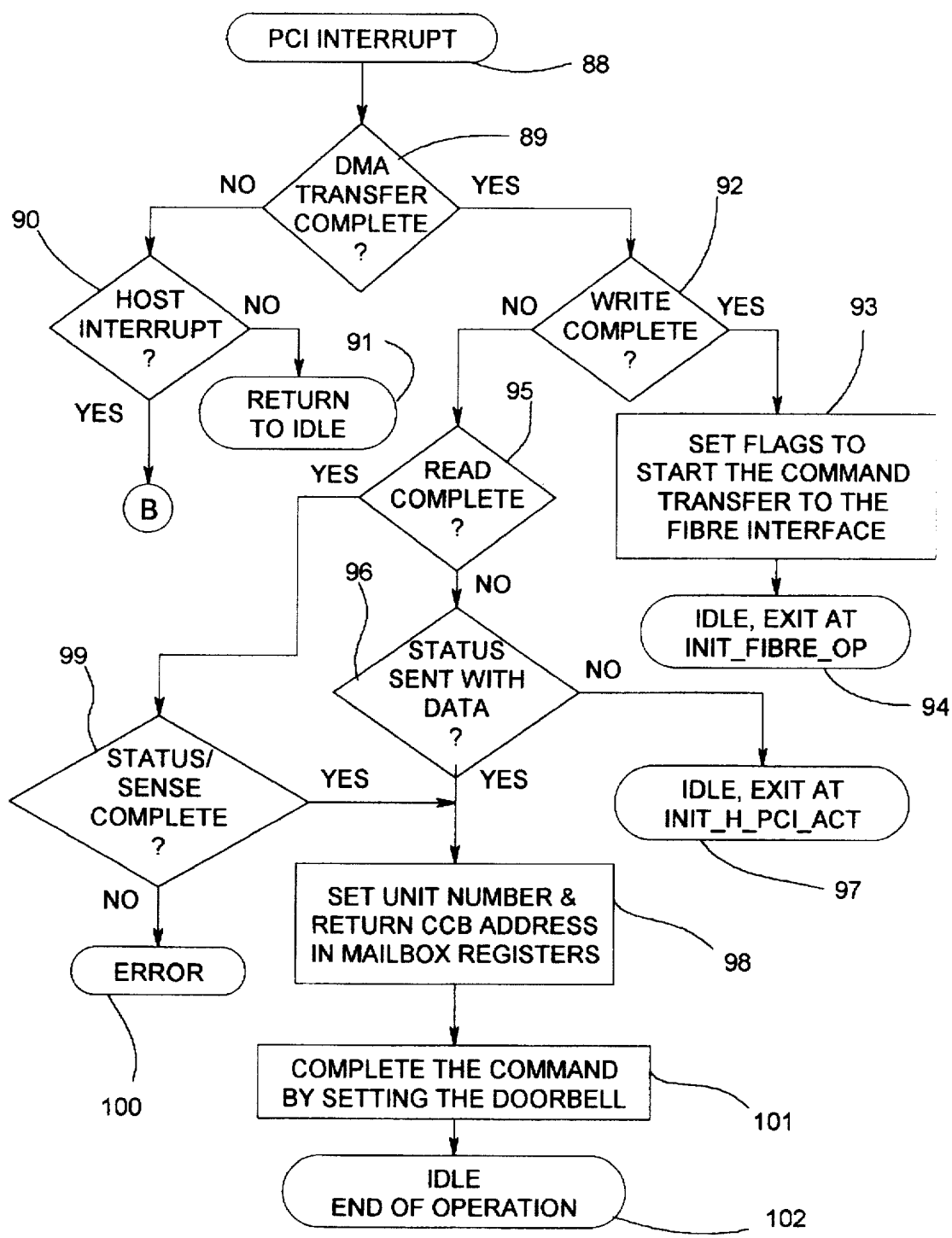
FIGS. 7A and 7B combined form a flow chart of a PC Interrupt routine.
Figure 7B:
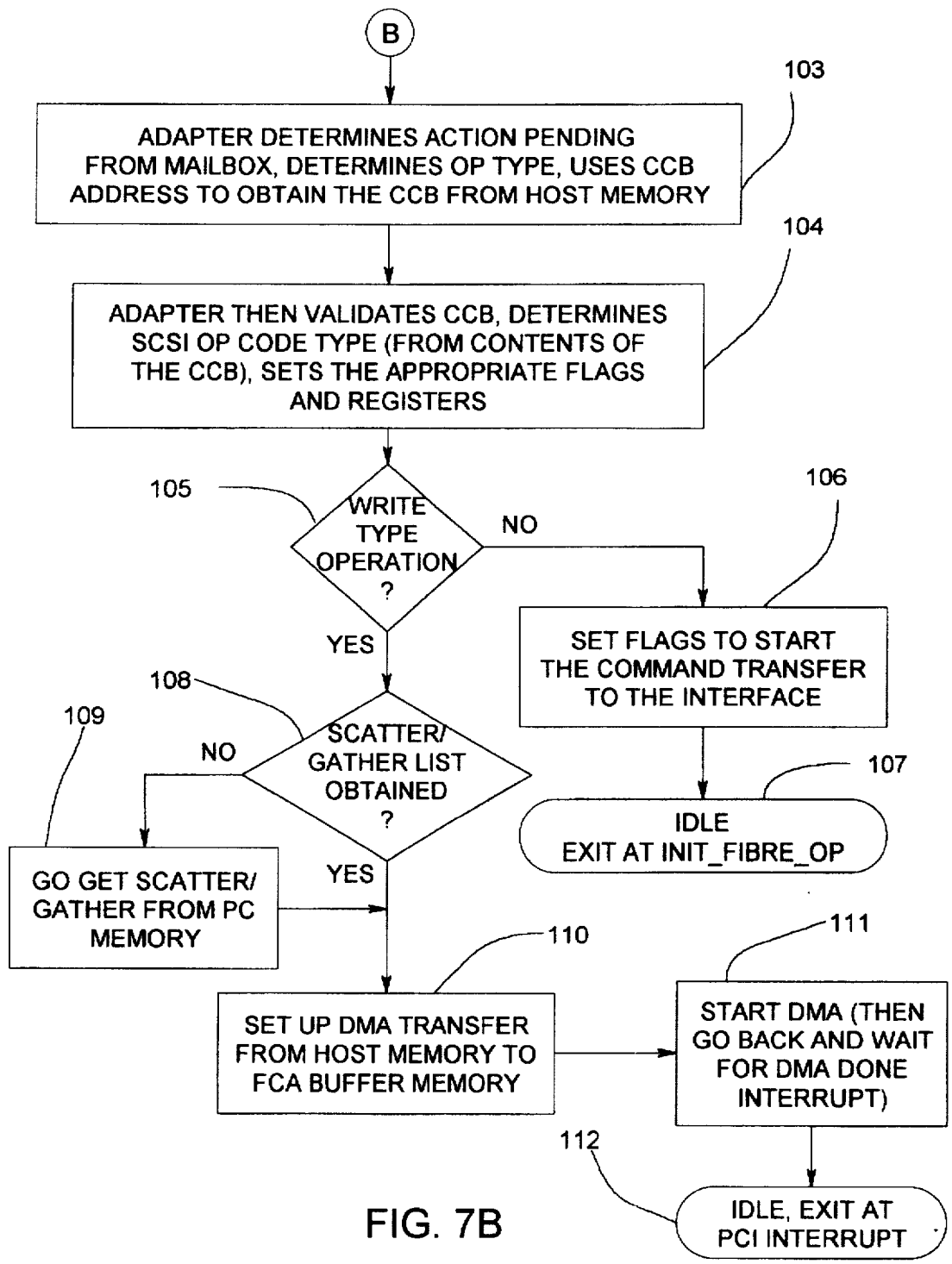
Figure 10:
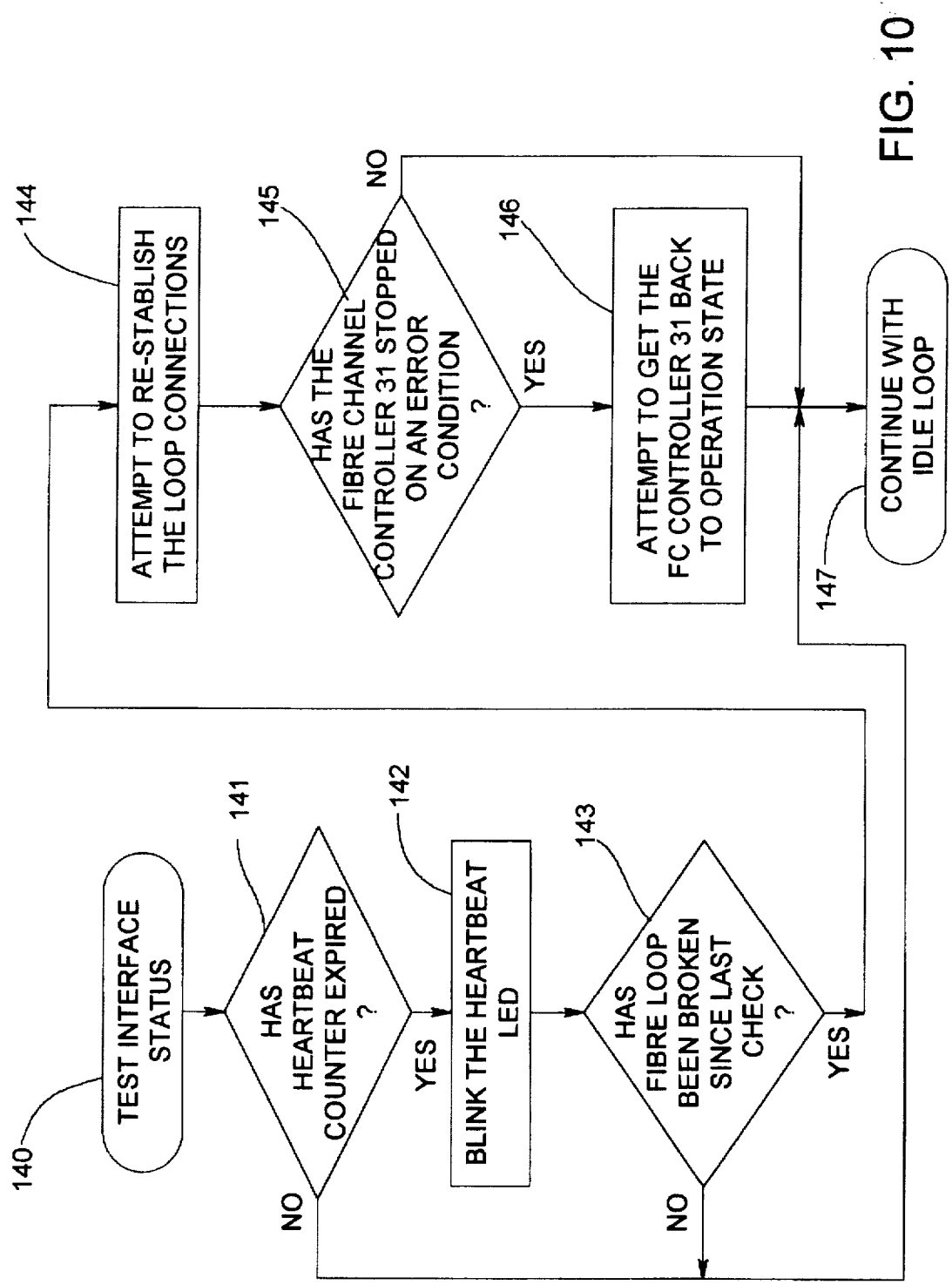
FIG. 10 is a flow chart of a routine for periodically verifying the integrity of the fibre channel interface.

If the answer to the inquiry at the diamond 78 is yes, then the condition is determined and handled (block 79—See FIGS. 7A and 7B). On the other hand if the answer is no, then a test is made to determine if a heartbeat counter has expired, and if so, blink a heartbeat indicator; and, sense to determine if the fibre channel has been broken since the last check. These functions are depicted by a block 80, which is amplified further hereinafter. This routine is illustrated in FIG. 10 and described further hereinafter. Once the testing step has been performed a return is made back to the inquiry diamond 70 and the idle loop is repeated.

Referring now to FIG. 6, a flow chart is shown of a generic operation, which is initiated within the host PC 11. The process begins with a START OPERATION bubble 82 followed by a process step (block 83) as follows: The host driver establishes a command control block (CCB) in the PC memory 13, and sets the unit number, operation type and address of the CCB in the mailbox registers within the PCI interface logic 28 of the adapter (FCA) 12. Next, the host drivers executing on the PC 11 start the FCA 12 by writing control sequences into the general purpose registers within the PCI interface logic 28, which registers are referred to herein as mailbox registers. This process step is depicted by a process block 84. After these sequences are written, the host driver sets the least significant bit of the doorbell register, which causes the host PC 11 to generate an interrupt to the FCA 12 (process block 85). Following this, a return is made to the idle routine to be exited at PCI INTERRUPT (at block 79, FIG. 5), as depicted by a bubble 86.

Referring now to FIG. 7A, the first part of a flow chart of the PCI INTERRUPT routine is shown. The process begins with a bubble 88, followed by an inquiry as to whether the routine was entered because of a DMA completion (diamond 89). If a DMA transfer completion is not pending, then another inquiry is made as to whether or not host interrupt is pending (diamond 90). If it is a host interrupt pending, then a branch is taken (as denoted by a connector "B") to the second part of this flow chart as illustrated in FIG. 7B and described further hereinafter. On the other hand, if this is not a host interrupt then a return is made back to the idle routine (bubble 91).

When the DMA transfer is complete, another inquiry is made as to whether or not a write operation is complete (diamond 92). If write is complete, then a process step (block 93) is performed to set flags to start the command transfer to the fibre interface. Following this, a return is made to the idle routine (to be exited at INT_FIBRE_OP (at block 72, FIG. 5), as depicted by a bubble 94. On the other hand, if it is not a write type operation, then yet another inquiry is made as to whether or not it is a read type operation DMA completion (diamond 95). If it is not a read type operation, then still another inquiry is made as to whether the DMA completion is for status having been sent to the host (diamond 96). If the answer to this inquiry is no, then a return is made to the idle routine to wait for the status at INIT_H_PCI_ACT (at block 73, FIG. 5), as depicted by a bubble 97.

On the other hand, if the status is sent with the data, then a process step is performed (block 98) as follows: the unit number and the CCB address are entered into the mailbox registers of the PCI Logic 28. Referring back briefly to the inquiry diamond 95, if the read operation is complete, an inquiry is made as to whether or not status/sense is complete (diamond 99). If the answer to this inquiry is no, then an error has occurred (bubble 100). On the other hand, if status/sense is complete then a branch is made to the process block 98 to set the unit number and the CCB address in the mailbox registers. Next, another process step is performed as depicted by a block 101 to complete the command by setting the doorbell register to interrupt the host for command completion. Finally, a return is made to the idle routine (FIG. 5) to await the next action, since this is the end of the operation (bubble 102).

Referring now to FIG. 7B, a continuation of the flow chart shown in FIG. 7A is shown, which begins with the connector "B". A process step (block 103) is performed as follows: the FCA 12 determines the action pending from the mailbox registers, the operation type, and uses the CCB address to obtain the CCB from the PC memory 13. Next, the FCA 12 validates the CCB, determines the SCSI operation code type (from the contents of the CCB), and sets the appropriate flags and registers (process block 104). Following this, an inquiry is made as to whether or not this is a write type of operation (diamond 105). If the answer to this inquiry is no, then a process step (block 106) is performed as follows: flags are set to start the command transfer to the fibre channel. Then a return is made to the idle routine to set up the command for transfer at INIT_FIBRE_OP (at block 72, FIG. 5) as depicted by a bubble 107.

Referring back to the inquiry diamond 105, if this is a write type of operation then another inquiry is made as to whether or not the scatter/gather list has been obtained (diamond 108). The term "scatter/gather" is used herein to refer to the locations for data to be transferred to/from, respectively, in the PC memory 13. The scatter/gather list is a table in the host memory describing the locations and sizes of the various portions of the data to be transferred from the host memory 13. If the answer to this inquiry is no, then a process step (block 109) is performed to go get the scatter/gather from the PC memory 13. On the other hand, if the scatter/gather list has been obtained (or following completion of the process step 109) then another process step (block 110) is performed to set up the DMA transfer from the PC memory 13 to the buffer memory 30 in the FCA 12. Following this step, another process step (block 111) is performed to start the DMA function to transfer the data. Finally, a return is made to the idle routine to exit at PCI INTERRUPT (at block 79, FIG. 5), as depicted by a bubble 112.

Referring now to FIG. 7C, a flow chart is shown for building structures for the FC controller 31 to execute a command. The FCA 12 responds by starting INT_FIBRE_OP (at block 72, FIG. 5), as depicted by a bubble 113. A process step depicted by a block 114 is next performed as follows: Determine the type of the SCSI command, set up command structures and start transfer of the command to the drive. Following this, a return is made to the idle routine (FIG. 5) to wait for a command completion interrupt (bubble 115).

Figure 8:
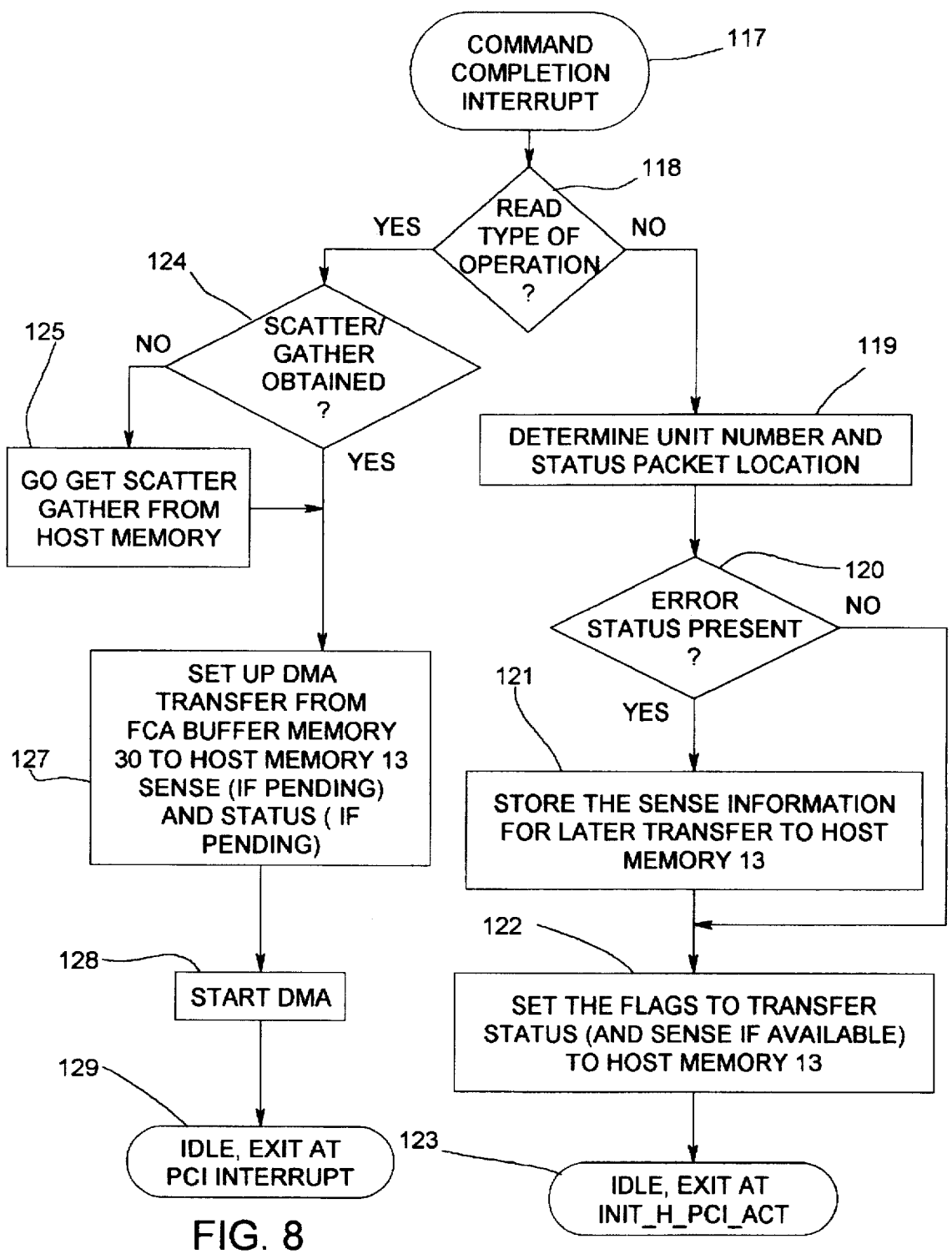
FIG. 8 is a flow chart of a command completion interrupt routine.

Referring now to FIG. 8, a flow chart of the Command Completion Interrupt is illustrated. The process begins with a bubble 117, followed by an inquiry as to whether or not this is a read type of operation (diamond 118). If the answer to this inquiry is no, then a process step (block 119) is performed to determine the unit number and status packet location. Next, another inquiry is made as to whether or not an error is present (diamond 120). If an error is present, then a process step (block 121) is performed to store the sense information for later transfer to the PC memory 13. Following this, another process step (block 122) is performed to set the flags to transfer status (and sense if available) to the PC memory 13. Finally, a return is made to the idle routine shown in FIG. 5 to be exited at INIT_H_PCI_ACT (at block 73, FIG. 5), as depicted by a bubble 123.

Referring again to the inquiry diamond 118, if the current operation is of a read type, then another inquiry is made as to whether or not the scatter/gather is obtained (diamond 124). If the answer to this inquiry is no, then a process step (block 125) is performed to go get the scatter/gather from the PC memory 13. On the other hand, if the scatter/gather has been obtained (or if obtained by the process step 125), then another process step (block 127) is performed as follows: set up DMA transfer from the FCA Buffer Memory 30 to the host memory 13, sense (if pending) as well as status (if pending). Once this step has been performed then the DMA transfer is started (process block 128). Finally, a return is made to the idle routine for an exit at the DMA completion PCI INTERRUPT (at block 79, FIG. 5), as depicted by a bubble 129.

Figure 9:
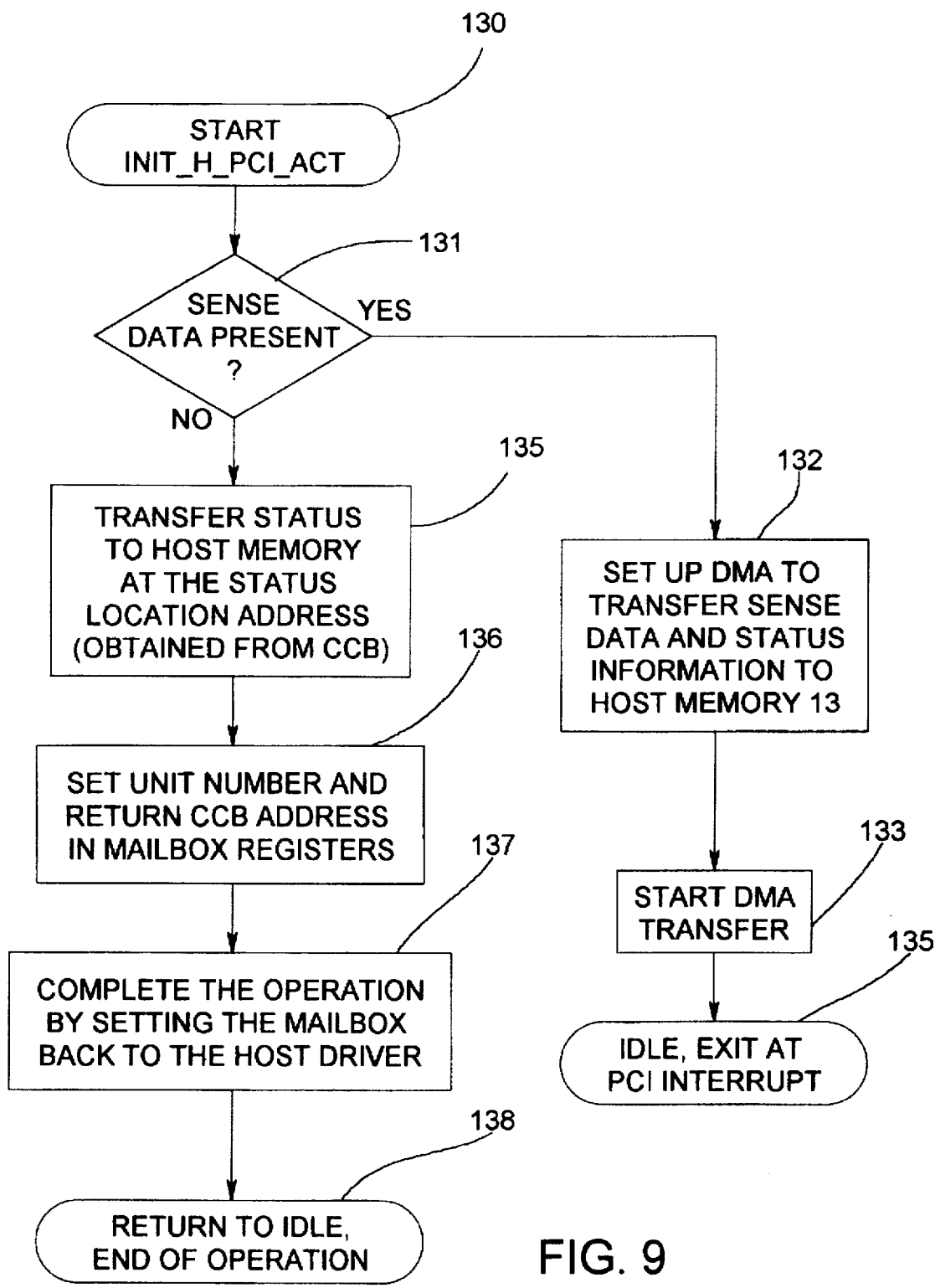
FIG. 9 is a flow chart that illustrates an action to be performed by the adapter before data is transferred to the host.

Referring now to FIG. 9, a flow chart is shown of an action to be performed to the host. The process begins with a START bubble 130 from (the diamond 71, FIG. 5) INIT_H_PCI_ACT, followed by an inquiry as to whether or not sense data is present (diamond 131). If the answer to this inquiry is yes, then a process step (block 132) is performed to set up the DMA to transfer sense data and status information to the PC memory 13. Next, the DMA transfer is started (block 133) followed by a return to the idle routine at PCI INTERRUPT (at block 79, FIG. 5), as depicted by a bubble 134.

Referring back to the diamond 131, if sense data is not present then a process step (block 135) is performed as follows: transfer status to PC memory 13 at the status location address, which is obtained form the CCB. Next, the unit number is set and the CCB address is returned to the doorbell registers (block 136). Following this, the operation is completed by setting the mailbox back to the host driver (block 137). Finally, a return is made to the idle routine (at the diamond 74, FIG. 5), since it is the end of the operation (bubble 138).

Referring now to FIG. 10, a flow chart is illustrated of a routine for periodically verifying the integrity of the fibre channel interface. The process begins with a start bubble 140, followed by an inquiry as to whether or not a heartbeat counter has expired (diamond 141). This is a conventional counter having approximately a 4 second time delay. If the counter has not expired, then a heartbeat LED (light emitting diode) is pulsed, which LED is located on the FCA 12, as depicted by a process block 142. Next, another inquiry is made (diamond 143) to determine if the fibre loop has been broken since the last check. If the answer to this inquiry is yes, then another process step is performed to attempt to re-establish the loop connections (process block 144).

Following this, yet another inquiry is made as to whether or not the FC controller 31 has stopped on an error condition (diamond 145). If the answer to this inquiry is yes, then yet another process step is performed to attempt to get the FC Controller 31 back to an operation state (block 146). After this step has been completed, then the idle is continued in the idle loop (at the diamond 70, FIG. 5), as depicted by a bubble 147. Referring back to the diamonds 141, 143 and 145, if the answer to any of these inquiries is a no, then the idle is likewise continued in the idle loop.

While the invention has been particularly shown and described with references to preferred embodiments thereof, it will be understood by those skilled in the art that various changes in form and details may be made therein without departing from the spirit and scope of the invention as defined by the appended claims.

APPENDIX A

"MACROS

```
    FLASH    MACRO  {( (REGION == ^hF) &  A27 )};
    CSTORE   MACRO  {( (REGION == ^hE) & !A27 )};
    CREG     MACRO  {( (REGION == ^hD) & !A27 )};

RES_C    MACRO  {( (REGION == ^hC)         )}; "RESERVED
    BEDB2    MACRO  {( (REGION == ^hB) &  A27 )}; "BIG ENDIAN DATA BUFFER 2 - NOT
    USED
    BEDB1    MACRO  {( (REGION == ^hB) & !A27 )}; "BIG ENDIAN DATA BUFFER 1

    TAC2     MACRO  {( (REGION == ^hA) &  A27 )}; "TACH. 2 - NOT USED
    TAC1     MACRO  {( (REGION == ^hA) & !A27 )}; "TACH. 1

LEDB2    MACRO  {( (REGION == ^h9) &  A27 )}; "LITTLE ENDIAN DATA BUFFER 2 - NOT
    USED
    LEDB1    MACRO  {( (REGION == ^h9) & !A27 )}; "LITTLE ENDIAN DATA BUFFER 1

RES_83   MACRO  {( (REGION <= ^h8)
                     & (REGION >= ^h3)      )}; "RESERVED

    PCIMEM   MACRO  {( (REGION == ^h2)         )}; "PCI MEMORY
    EXPROM   MACRO  {( (REGION == ^h1)         )}; "EXPANSION ROM
    PLXREG   MACRO  {( (REGION == ^h0) &  A27 )}; "PLX REG

RES_0    MACRO  {( (REGION == ^h0) & !A27 )}; "RESERVED
    DB2      MACRO  {( BEDB2 # LEDB2 )}; "DATA BUFFER 2 - NOT USED
    DB1      MACRO  {( BEDB1 # LEDB1 )}; "DATA BUFFER 1

    FC2      MACRO  {( TAC2 # DB2 )}; "FIBRE CHANNEL 2 - NOT USED
    FC1      MACRO  {( TAC1 # DB1 )}; "FIBRE CHANNEL 1

PCIACC   MACRO  {( PLXREG # PCIMEM )};
```

```
TACHOK   MACRO {( DB1 # PCIMEM      )};

PLXOK    MACRO {( DB1 # EXPROM # TAC1 )};

TBREQ    MACRO {( (( TREQ == ^h1)          )
         # (( TREQ == ^h2) & PAFULL_) )};

uPBREQ   MACRO {( !EXTREQ_ )};

T_TARGET MACRO {( ((BCS.FB == uPWAIT ) & TAC1  )
         # ((BCS.FB == PLXWAIT) & TAC1  ) )};

P_TARGET MACRO {( ((BCS.FB == uPMST  ) & PCIACC & !EXTBGNT_.FB )
         # ((BCS.FB == uPWAIT ) & PCIACC            )
         # ((BCS.FB == TACMST ) & PCIACC            )
         # ((BCS.FB == TACTURN) & PCIACC            )
         # ((BCS.FB == TACWAIT) & PCIACC            ) )};
```

EQUATIONS
"
"ENABLE OUTPUTS WHEN 'TS_' IS HI

MASTERS.OE = TS_ ; "3
TARGETS.OE = TS_ ; "2

BCS.OE    = TS_ ; "4
"SPARE.OE  = TS_ ;

[ BTERM_ , PRDYIN_, PBOFF , PLOCK_ , PPAR2D_, DPAR2P_ , TBG_ , LERR_ ].OE = TS_ ;
[ PRDYERR_, PECLK , PEINT_, RDY2uP_, TRETRY_, LCHD2uP_, TINT_, NMI_ ].OE = TS_ ;
[ TESTPT                                                            ].OE = TS_ ;

"ENABLE OUTPUTS WHEN 'TS_' IS HI AND TACH. IS THE MASTER

TRDY_.OE  = ( TS_ & !TBM_ ); "DEFAULT FEEDBACK = .PIN

"ENABLE OUTPUTS WHEN 'TS_' IS HI AND TACH. IS THE MASTER OR THE BUS IS IDLE

BLAST_.OE = (( TS_ & !TBM_        )
            # ( TS_ & (BCS.FB == IDLE )));

"ENABLE OUTPUTS WHEN 'TS_' IS HI AND TACH. IS NOT THE BUS MASTER

AVCS_.OE  = ( TS_ & TBM_ ); "AV.CS/ IS ACTIVE FOR 1 CLK

"ENABLE OUTPUTS WHEN 'TS_' IS HI AND PLX IS NOT THE BUS MASTER

ADS_.OE   = ( TS_ & !PBGNT ); "ADS/ IS ACTIVE FOR 1 CLK

```
"CLOCK AND RESET
BCS.CLK    = CLK  ;
BCS.AR     = !RESET_ ;

[ PEINT_, DBSEL_, PCIRSEL_, RDY2uP_, PRDYIN_, LERR_, PRDYERR_, PBOFF ].CLK = CLK
;
[ PEINT_, DBSEL_, PCIRSEL_, RDY2uP_, PRDYIN_, LERR_, PRDYERR_, PBOFF ].AR =
!RESET_ ;

[ AVCS_, TINT_, NMI_, LCHD2uP_, EXTBGNT_ ].CLK = CLK  ;
[ AVCS_, TINT_, NMI_, LCHD2uP_, EXTBGNT_ ].AR = !RESET_ ;

[ PRDY2T, EOB1, EOB2, INTCNT, ERRCNT, USRCNT, ADS1, BLAST1, LTBR1, LTBR0 ].CLK =
CLK  ; "NODES
[ PRDY2T, EOB1, EOB2, INTCNT, ERRCNT, USRCNT, ADS1, BLAST1, LTBR1, LTBR0 ].AR =
!RESET_ ;

EXTBGNT_.D  = ( (BCS.FB == uPMST ) # (BCS.FB == uPWAIT ));

PBGNT      = ( (BCS.FB == PLXMST ) # (BCS.FB == PLXWAIT));

TBM_       = !( (BCS.FB == TACMST ) # (BCS.FB == TACTURN) # (BCS.FB == TACWAIT));

TBG_       = !( (BCS.FB == TACMST ) # (BCS.FB == TACTURN) # (BCS.FB == TACWAIT));
```

```
      PRDY2T.D   = (( !TBM_ & PCIMEM & !PRDYOUT_ & WRT    ) "LATCH FIRST PLX
      READY (DIRECT WRT) -- NOT USED
                # ( !TBM_ & PCIMEM &  PRDY2T.Q & AVCS_.PIN )); "HOLD

"DRIVEN WHEN TACH. IS THE MASTER
                                              "TACH. ONLY NEEDS 1 CLK LONG RDY
      TRDY_     = !((( BCS.FB == TACWAIT) & !DBSEL_.FB & !WRT    ) "ACC TO DB
                # ( (BCS.FB == TACWAIT) & !DBSEL_.FB &  WRT & EOB  ) "DELAY RDY
      UNTIL LAST DATA XFER

# ( (BCS.FB == TACWAIT) & PCIMEM   & !WRT   & !PRDYOUT_ ) "DIRECT
      MASTER RD
                # ( (BCS.FB == TACWAIT) & PCIMEM   &  WRT   & !PRDYOUT_ ) "DIRECT
      MASTER WRT
              "  # ( (BCS.FB == TACWAIT) & PAFULL_  & WRT & EOB & PRDY2T.Q ) DIRECT
      MASTER WRT - DELALY RDY
              "
                                       UNTIL PLX FIFO IS EMPTY

               # ( (BCS.FB == TACWAIT) & !LERR_.FB          )); "ILLEGAL ACC
                                              "TACH 2PLXREG = LOCAL ERROR

BLAST1.D  = (( (BCS.FB == TACWAIT) & PRDYOUT_ & PCIMEM & (TREQ == ^h3) )
      "SET
                # ( BLAST1.Q       & PRDYOUT_             )); "HOLD UNITL PLX IS RDY

"DRIVEN WHEN TACH. IS THE MASTER
      BLAST_    = !(( (BCS.FB == TACWAIT) & PCIMEM & (TREQ == ^h3) ) "DIRECT MASTER
      ACCESS
                # ( BLAST1.Q           ));

     PCIRSEL_.D = ((( BCS.FB == uPMST ) & PLXREG & !EXTBGNT_.FB )
                # ( (BCS.FB == uPWAIT ) & PLXREG & RDY2uP_.FB )
                # ( (BCS.FB == uPWAIT ) & PLXREG & BLAST_.PIN )); "TACH 2 PLXREG =
      LOCAL ERROR

      DBSEL_.D  = ((( (BCS.FB == uPMST ) & DB1 & !EXTBGNT_.FB    )
                # ( (BCS.FB == uPWAIT ) & DB1 & BLAST_.PIN    )
                # ( (BCS.FB == uPWAIT ) & DB1 & !BLAST_.PIN & !WRT ) "HOLD DURNING
      READS
                # ( (BCS.FB == PLXMST ) & DB1 & !ADS_.PIN    )
                # ( (BCS.FB == PLXWAIT) & DB1 & BLAST_.PIN   )

# ( (BCS.FB == TACMST ) & DB1 & !AVCS_.PIN   )
                # ( (BCS.FB == TACWAIT) & DB1 & !AVCS_.PIN   ) "STREAM
                # ( (BCS.FB == TACTURN) & DB1                )
                # ( (BCS.FB == TACWAIT) & DB1 & !EOB         ));
```

```
                                            "PLX IS THE BUS MASTER
     PRDYIN_D  = ((( BCS.FB == PLXMST ) & DB1    & !ADS_.PIN    )  "ACC. TO DB
              #  (( BCS.FB == PLXWAIT) & !DBSEL_.FB & BLAST_.PIN )
              #  (( BCS.FB == PLXMST ) & EXPROM   & !ADS_.PIN    )  "ACC. TO EXPROM

#  (( BCS.FB == PLXWAIT) & TAC1     & !TRDY_.PIN   )  "ACC. TO TACH.
              #  (( BCS.FB == PLXWAIT) & TAC1     & (ERRCNT.Q == ^h7)) "TACH. ERROR
              #  (( BCS.FB == PLXWAIT) & !LERR_FB              )); "ILLEGAL ACC

BTERM_   = 1 ;
     PLOCK_   = 1 ;
     PBOFF.D  = 0 ; "PLX WILL RELEASE BUS IF PBOFF = 1, DURING DMA'S.
              "IE. REQUEST BY uP/TACH

"       = (( PBUSREQ & !TBR1_  )
              "       #  ( PBUSREQ & !TBR0_  )
              "       #  ( PBUSREQ & !EXTREQ_ ));

"REM: DURING DIRECT MASTER ACCESSES, THE uP OR TACH.
              "     IS THE BUS MASTER -- NOT PLX

TRETRY_  = 1 ; "READS ONLY

     AVCS_.D  = ((( BCS.FB == uPMST  ) & TAC1 & !EXTBGNT_.FB )  "DRIVEN WHEN TACH.
     IS THE TARGET
              #  (( BCS.FB == PLXMST ) & TAC1 & !ADS_       )); "PLX 2TACH

     ADS1.D   = ((( BCS.FB == uPMST  ) & PLXREG & !EXTBGNT_.FB )
              #  (( BCS.FB == uPMST  ) & PCIMEM & !EXTBGNT_.FB ));

ADS_     = !(( ADS1.FB      )            "DRIVEN WHEN PLX IS NOT THE BUS MASTER
     "        #  (( BCS.FB == TACWAIT) & !AVCS_.PIN )   STREAMING
              #  (( BCS.FB == TACMST ) & !AVCS_.PIN )); "TACH 2PLXREG (LOCAL.ERR)

RDY2uP_D = ((( BCS.FB == uPMST  ) & DB1    & !EXTBGNT_.FB & WRT )  "DELAY
     READ RDY 1 CLK
              #  (( BCS.FB == uPWAIT ) & DB1                    )

(( BCS.FB == uPWAIT ) & PCIACC & !PRDYOUT_     )

              #  (( BCS.FB == uPWAIT ) & TAC1   & !TRDY_.PIN    )
              #  (( BCS.FB == uPWAIT ) & TAC1   & (ERRCNT.Q == ^h7) )); "TACH. ERROR
```

29

```
    DPAR2P_   = (( PBGNT   & WRT )
            #  ( P_TARGET & !WRT ));

PPAR2D_   = !(( PBGNT  & WRT )
            #  ( P_TARGET & !WRT ));

LCHD2uP_.D = (( (BCS.FB == uPWAIT ) & !WRT & PLXREG & !PRDYOUT_ )  "SET
            #  ( (BCS.FB == uPWAIT ) & !WRT & TAC1  & !TRDY_.PIN )  "SET
            #  ( (BCS.FB == uPWAIT )          & !LCHD2uP_.FB )  "HOLD
            #  ( (BCS.FB == 11   )            & !LCHD2uP_.FB ));  "HOLD

PECLK     = (( !TBM_   & !WRT & !TRDY_ & CLK )  "MODEL GIVES 15 ns DELAY, ie. 1 ns
    HOLD, REAL
            #  ( T_TARGET & WRT & !TRDY_ & CLK ));

PEINT_.D  = (( !PE_           )  "SET (D2T.PE) - WILL NOT BE SET IF
            #  ( !PEINT_.FB & CLRPE_ ));  "RDY ERROR IS DET. (LAST WORD )

LERR_.D   = (( !TBM_     & !AVCS_.PIN & !TACHOK )  "TACH. ILLEGAL ACCESS
            #  ( !TBM_     & !LERR_.FB          )  "HOLD

#  ( PBGNT     & !ADS_.PIN & !PLXOK )  "PLX ILLEGAL ACCESS
            #  ( PBGNT     & !LERR_.FB          )  "HOLD

#  ( !TBM_     & PBUSREQ & PCIMEM )  "POTENTIAL DEAD LOCK
                                                 "  ACCESS TO DB
                                                 "  ACCESS TO PLXREG
                                                 "NO WAY TO BACKOFF TACH

#  ( !EXTBGNT_.FB & PBUSREQ & PCIMEM ));  "POTENTIAL DEAD LOCK
                                                 "  ACCESS TO DB
                                                 "  ACCESS TO PLXREG
                                                 "  ACCESS TO TACH
                                                 "NO WAY TO BACKOFF uP (BTERM )

EOB1.D    = ( EOB );

EOB2.D    = ( EOB & !EOB1.Q );

PRDYERR_.D = ( PRDYOUT_ & !TBM_ & PCIMEM & !WRT & !EOB1 );  "CHECK FOR
    RDYS WHILE TACH.
                                    "IS READING FROM PCI MEMORY
```

```
    INTCNT.D  = (( !TIRQ_     & [0,0,0]            ) "LOAD
              # ( !(INTCNT == ^h7) & !TINT_.FB & (INTCNT.Q +1) )); "COUNT TO 7 AND STOP

    TINT_.D   = (( !TIRQ_                  )
              # ( !(INTCNT == ^h7) & !TINT_.FB ));

    ERRCNT.D  = (( !TAC1 & [0,0,0] )                        "LOAD
              # ( TERR_ & [0,0,0] )                         "LOAD
              # ( (BCS.FB == uPWAIT) & TAC1 & !TERR_ & !(ERRCNT.Q == ^h7) & (ERRCNT.Q
    +1) ) "COUNT
              # ( (BCS.FB == PLXWAIT) & TAC1 & !TERR_ & !(ERRCNT.Q == ^h7) & (ERRCNT.Q
    +1) ) "COUNT
              # (            TAC1 & !TERR_ & (ERRCNT.Q == ^h7) & (ERRCNT.Q   ) )); "HOLD

USRCNT.D  = (( !USERO_    & [0,0,0]            ) "LOAD
              # ( !(USRCNT == ^h7) & !NMI_.FB & (USRCNT.Q +1) )); "COUNT TO 7 AND STOP

NMI_.D    = (( !SERR_              )
              # ( !USERO_              )
              # ( !(USRCNT == ^h7) & !NMI_.FB ));

LREQ.D    = (( TREQ  & !AVCS_.PIN )
              # ( LREQ.Q &  AVCS_.PIN ));

"TESTPT   = PEINT_.FB & TERR_ & ( TIRQ_ & TINT_ ) ;  PRDYERR_.FB & LERR_.FB ARE
    PART OF INT0

    TESTPT    = PEINT_.FB & TERR_              ;  "PRDYERR_.FB & LERR_.FB ARE PART
    OF INT0
```

```
STATE_DIAGRAM  BCS   "LOCAL BUS CONTROL STATE MACHINE

STATE IDLE:   "STATE 0 -- IDLE

CASE
   ( uPBREQ                ): uPMST  ;
   ( !uPBREQ &  PBREQ      ): PLXMST ;
   ( !uPBREQ & !PBREQ &  TBREQ ): TACMST ;
   ( !uPBREQ & !PBREQ & !TBREQ ): IDLE   ;

ENDCASE;

STATE uPMST:  "STATE C -- uP IS THE BUS MASTER

CASE
   ( !EXTBGNT_.FB ): uPWAIT ; "
   (  EXTBGNT_.FB ): uPMST  ; "

ENDCASE;

STATE uPWAIT: "STATE D -- uP IS THE BUS MASTER

CASE
   ( BLAST_.PIN  #  RDY2uP_.FB ): uPWAIT ; "WAIT FOR PLX/TACH. RDY
   ( !BLAST_.PIN & !RDY2uP_.FB ): I1     ; "uP DMA'S ARE MULTI-BURSTS, NOT ONE
OWNERSHIP

ENDCASE;

STATE I1:    "STATE E -- IDLE 1 - WHERE TO NEXT ?

CASE
   (      PBREQ            ): PLXMST ;
   (     !PBREQ &  TBREQ   ): TACMST ;
   (  uPBREQ & !PBREQ & !TBREQ ): uPMST ;
   ( !uPBREQ & !PBREQ & !TBREQ ): IDLE  ;

ENDCASE;
```

```
        STATE PLXMST:  "STATE 4 -- PLX IS THE BUS MASTER

CASE
           ( ADS_PIN           ): PLXMST ;
           ( !ADS_PIN          ): PLXWAIT;

ENDCASE;

       STATE PLXWAIT: "STATE 5 -- PLX IS THE BUS MASTER

CASE
           ( PBREQ             ): PLXWAIT; "WAIT FOR PLX TO GIVE UP THE BUS
           ( !PBREQ            ): I2   ; "PLX DMA'S CAN BE ONE OWNERSHIP, MULTI-BURSTS
           ENDCASE;

STATE I2:     "STATE 6 -- IDLE 2 - WHERE TO NEXT ?

          CASE
           (              TBREQ ): TACMST ;
           ( uPBREQ      & !TBREQ ): uPMST ;
           ( !uPBREQ &  PBREQ & !TBREQ ): PLXMST ;
           ( !uPBREQ & !PBREQ & !TBREQ ): IDLE  ;
           ENDCASE;
```

```
        STATE TACMST: "STATE 8 -- TACHYON IS THE BUS MASTER

CASE
          ( AVCS_.PIN      ): TACMST ;
          ( !AVCS_.PIN &  WRT ): TACWAIT;
          ( !AVCS_.PIN &  !WRT ): TACTURN;

ENDCASE;
        STATE TACWAIT: "STATE 9 -- TACHYON IS THE BUS MASTER

CASE
          ( !EOB &  AVCS_.PIN            ): TACWAIT;
          ( EOB & !AVCS_.PIN & !WRT       ): TACTURN; "CONT. READ  STREAMING - DIR
          MST
          ( EOB & !AVCS_.PIN &  WRT       ): TACWAIT; "CONT. WRITE STREAMING - DIR
          MST
          ( EOB &  AVCS_.PIN &  (TREQ == LREQ)       ): TACWAIT; "WAIT FOR TACH TO GIVE-uP
          THE BUS
          ( EOB &  AVCS_.PIN & !(TREQ == LREQ) & !TERR_ ): TACWAIT; "IGNORE REQ CHANGE,
          IF T.ERROR/ IS TRUE
          ( EOB &  AVCS_.PIN & !(TREQ == LREQ) &  TERR_ ): I3    ;

ENDCASE;

       STATE TACTURN: "STATE A -- TACHYON IS THE BUS MASTER

GOTO TACWAIT;

STATE I3:    "STATE B -- IDLE 3 - WHERE TO NEXT ?
            CASE
          ( uPBREQ           ): uPMST ;
          ( !uPBREQ &  PBREQ      ): PLXMST ;
          ( !uPBREQ & !PBREQ &  TBREQ ): TACMST ;
 40       ( !uPBREQ & !PBREQ & !TBREQ ): IDLE  ;

ENDCASE;
```

APPENDIX B

"MACROS

    LOAD   MACRO {( !TBM_ & !AVCS_      )};
    RDRDY  MACRO {( !TBM_ & !LT2 & !TRDY_ )}; "TACH. READS - WAIT FOR 1ST RDY

    EQUATIONS
    "
    "ENABLE OUTPUTS IF 'TS/' IS HI:
    "
    XLEN.OE   = TS_ ; "3
    [ ADD2T_, DATA2T_, T2ADD, T2DATA_, HLDADD_,
      LD , ENPE , EOB , CNTEN     ].OE = TS_ ;

"ENABLE OUTPUTS IF 'TS/' IS HI AND TACH. IS THE TARGET (1 CLK)
    AOE      = TS_ & TBM_ & !AVCS_ ;
    A.OE     = AOE ; "5      DEFAULT FEEDBACK = .PIN
    TYPE.OE  = AOE ; "3

    "ENABLE OUTPUTS IF 'TS/' IS HI AND TACH. IS THE MASTER

BOE     = TS_ & !TBM_ ;
    B42.OE  = BOE ; "3       DEFAULT FEEDBACK = .PIN
    BEN.OE  = BOE ; "4
    WRT.OE  = BOE ; "

"CLOCK AND RESET
    [ B42, CNTEN, XLEN, EOB, T2ADD ].CLK = CLK ;
    [ B42, CNTEN, XLEN, EOB, T2ADD ].AR  = !RESET_ ;

[ LTIN, TURN, ENPE1, EOB1, EOB2, D2T1, D2T2, T2D1, T2D2, HLDADD ].CLK = CLK ;
    "NODES
    [ LTIN, TURN, ENPE1, EOB1, EOB2, D2T1, D2T2, T2D1, T2D2, HLDADD ].AR  = !RESET_ ;

LTIN.D   = (( TYPE & !AVCS_     ) "SET
             # ( LTIN.Q & AVCS_ & !TBM_ ) "HOLD
             # (            TBM_ )); "RESET TO HI

TURN.D   = (( TBM_ & !AVCS_ & !WRT ) "READ FROM TACH
             # ( !TBM_ & !AVCS_ & !T2 )); "TACH. READS

WRT     = (( T2 & !AVCS_ )   "DRIVEN WHEN TACH. IS THE MASTER
# ( LT2 & AVCS_ ));

```
    BEN3      = 0 ;          "DRIVEN WHEN TACH. IS THE MASTER
    BEN2      = 0 ;
    BEN1      = 0 ;
    BEN0      = 0 ;

A4        = B4 ;          "DRIVEN WHEN TACH. IS THE TARGET
    A3        = B3 ;
    A2        = B2 ;
    A1        = !(BEN == 0);
    A0        = !(BEN == 0);

T2        = WRT ;         "DRIVEN WHEN TACH. IS THE TARGET
    T1        = !(BEN == 0);
    T0        = !(BEN == 0);

ADD2T_    = !( TBM_ & !AVCS_ );   "ONE CLK ONLY

D2T1.D    = (( !TBM_ & !AVCS_ & !T2          )  "TACH. READS
              # ( !TBM_ & TURN.Q                 )
              # ( !TBM_ & !WRT.COM & D2T1.Q & !EOB.FB )  "HOLD
              # ( !TBM_ & !WRT.COM & D2T1.Q & !EOB1.Q ));  "HOLD

D2T2.D    = (( TBM_ & WRT & !AVCS_           )  "WRITE TO TACH.
              # ( TBM_ & WRT & D2T2.Q & TRDY_ ));  "HOLD UNTIL TACH. IS RDY

DATA2T_   = !( D2T1.Q # D2T2.Q );

T2ADD.D   = !TBM_ ;

T2D1.D    = (( !TBM_ & T2 & !AVCS_           )  "TACH. WRITES
              # ( !TBM_ & WRT.COM & T2D1.Q & !EOB.FB ));  "HOLD

T2D2.D    = (( TBM_ & !WRT & !AVCS_          )  "READ FROM TACH.
              # ( TBM_ & !WRT & T2D2.Q & TRDY_ ));  "HOLD UNTIL TACH. IS RDY

T2DATA_   = !( T2D1.Q # T2D2.Q );

HLDADD.D  = (( !TBM_ & !AVCS_ )
              # ( !TBM_ & AVCS_ & !EOB2.Q & HLDADD.Q ));

HLDADD_   = !(( !TBM_ & !AVCS_ )
              # ( HLDADD.Q ));
```

```
        ENPE1.D   = ( !DATA2T_ );

"74833 ASYNC CLR/
        ENPE      = ( !DATA2T_   "TACH. READS or WRITES TO TACH.
             #      ENPE1.Q ); "HOLD/DON'T CLR FOR 1 CLK (PE -> LATCH)

LD        = ( LOAD );

        CNTEN.D   = (( LOAD         & T2 & !(!T1 & !T0) )   "SET FOR TACH. WRITES >1
                  # ( RDRDY  & !EOB.FB   & !(!LT1 & !LT0) )  "SET FOR TACH. READS >1,
        WHEN 1ST RDY IS RECEIVED
                  # ( CNTEN.FB & !EOB.FB             )); "HOLD
                                                    "DRIVEN WHEN TACH. IS THE
        MASTER
        B42.D     = (( LOAD                    & A42.PIN )  "LOAD

          # ( !LOAD & !LT2 & !RDRDY        & !CNTEN.FB & !EOB.FB & (B42.FB   ))
        "HOLD
                  # ( !LOAD & !LT2 & RDRDY & !(!LT1 & !LT0) & !CNTEN.FB & !EOB.FB & (B42.FB
        +1))  "COUNT - 1ST READ
                  # ( !LOAD & !LT2            & CNTEN.FB & !EOB.FB & (B42.FB +1))
        "COUNT

# ( !LOAD & LT2             & !CNTEN.FB & !EOB.FB & (B42.FB  )) "HOLD
                  # ( !LOAD & LT2             & CNTEN.FB & !EOB.FB & (B42.FB +1)));
        "COUNT

XLEN.D    = (( LOAD & !T1 & !T0  & LEN1 )                    "LD - 1 WORD
        XFER
                  # ( LOAD & !T1 & T0   & LEN2 )                     "LD - 2 WORD
        XFER
                  # ( LOAD & T1  & !T0  & LEN4 )                     "LD - 4 WORD
        XFER
                  # ( LOAD & T1  & T0   & LEN8 )                     "LD - 8 WORD XFER

                # ( !LOAD & !LT2 & !RDRDY        & !CNTEN.FB & !EOB.FB & (XLEN.FB  ))
        "HOLD
                  # ( !LOAD & !LT2 & RDRDY & !(!LT1 & !LT0) & !CNTEN.FB & !EOB.FB &
        (XLEN.FB -1))  "COUNT - 1ST READ
                  # ( !LOAD & !LT2            & CNTEN.FB & !EOB.FB & (XLEN.FB -1))
        "COUNT

# ( !LOAD & LT2             & !CNTEN.FB & !EOB.FB & (XLEN.FB )) "HOLD
                  # ( !LOAD & LT2             & CNTEN.FB & !EOB.FB & (XLEN.FB -1)));
        "COUNT

EOB.D     = !(( TBM_                       )
                  # ( LOAD & T2 & !T1 & !T0                ) "LD - 1 WORD XFER
                  # ( !TBM_ & AVCS_ & (XLEN.FB == 0) & !LT2 & (!LT1 & !LT0) & !TRDY_ )
```

```
     #  ( !TBM_ &  AVCS_ & (XLEN.FB == 1) & !LT2 &  (!LT1 &  LT0) &  RDRDY )
     #  ( !TBM_ &  AVCS_ & (XLEN.FB == 1) & !LT2 &  ( LT1 & !LT0)         )
     #  ( !TBM_ &  AVCS_ & (XLEN.FB == 1) & !LT2 &  ( LT1 &  LT0)         )
     #  ( !TBM_ &  AVCS_ & (XLEN.FB == 1) &  LT2                          )
     #  ( !TBM_ &  AVCS_ & (XLEN.FB == 0)                        )); "HOLD UNTIL TACH.
GIVES UP THE BUS

     EOB1.D   = ( EOB.FB );

EOB2.D   = ( EOB.FB & !EOB1.Q );
```

I claim:

1. In a file server having a peripheral storage subsystem coupled thereto by means of a fibre channel, said file server including a memory and an apparatus disposed between said file server and said storage subsystem for adapting fibre channel transmissions to and from an industry standard data bus of said file server, said apparatus including an interface logic having a doorbell register and mailbox registers, a buffer memory, a fibre channel controller and a microprocessor executing a method comprising the steps of:

a. sensing if an interrupt has occurred by said file server, and if so, determining condition of said interrupt by said file server and handling it, and if no interrupt has occurred;
   b. testing an interface between said fibre channel and said apparatus to assure connectivity of said fibre channel;
   c. sensing if an action is to be taken in response to said interrupt, and if so attempting to take appropriate action by:
      i.) determining type of SCSI command;
      ii.) setting up command structures;
      iii.) starting transfer of command to one of said disk drives; and,
      iv.) idling until a command completion interrupt is received;
   d. sensing if an action is to be taken for communicating with said file server, and if so, attempting to take appropriate action, and if no action is to be taken;
   e. sensing if a previously queued mailbox action is pending, and if so, checking to determine if said doorbell register is empty, and if so load said mailbox registers and said doorbell register, and if no action is pending;
   f. sensing if an interrupt has occurred on said fibre channel, and if yes, determining condition of said interrupt by said fibre channel and handling it; and,
   g. repeating steps a through f hereof.

2. A method as in claim 1 wherein said step of determining condition of said interrupt by said file server and handling it further includes the steps of:

a. sensing if a DMA transfer is complete, and if yes;
   b. sensing if write data transfer is complete, and if yes, setting flags to start command transfer to said fibre channel;
   c. if said write is not complete, sensing if read is complete and if not;
   d. sensing if status has been sent with data, and if yes;
   e. setting unit number and return a Command Control Block ("CCB") address to mailbox registers of said apparatus;
   f. completing command by setting doorbell registers of said apparatus.

3. A method as in claim 2 where DMA transfer is not complete, further including the steps of:

a. sensing if said interrupt is by said file server, and if yes;
   b. reading said mailbox registers to determine if an action is pending;
   c. determining operation type and using said CCB address to obtain said CCB from said file server memory;
   d. validating said CCB and determining SCSI operation type from contents of said CCB;
   e. setting appropriate flags and registers;
   f. sensing if this is a write type of operation, and if not, setting flags to start command transfer to said fibre channel;
   g. if this is a write type of operation, determining if a scatter/gather list for this action has been obtained, and if so;
   h. setting up a DMA transfer from said file server memory to said buffer memory of said apparatus; and,
   i. starting said DMA.

4. A method as in claim 1 wherein said step of attempting to take appropriate action in response to a transmission from said file server further comprises the steps of:

a. determining whether or not sense data is present, and if so;
   b. setting up a DMA to transfer sense data and status information to said file server memory; and,
   c. starting said DMA transfer.

5. A method as in claim 4 where sense data is not present further including the steps of:

a. transferring status to said file server memory at status location address which is obtained from said CCB;
   b. setting unit number and return said CCB address in said mailbox registers; and,
   c. completing command by setting doorbell registers of said apparatus.

6. In a file server having a peripheral storage subsystem coupled thereto by means of a fibre channel, said file server including a memory and an apparatus disposed between said file server and said storage subsystem for adapting fibre channel transmissions to and from an industry standard data bus of said file server, said apparatus including an interface logic having a doorbell register and mailbox registers, a buffer memory, a fibre channel controller and a microprocessor executing a method comprising the steps of:

a. sensing if an interrupt has occurred by said file server, and if so, determining condition of said interrupt by said file server and handling it, and if no interrupt has occurred;
   b. testing an interface between said fibre channel and said apparatus to assure connectivity of said fibre channel;
   c. sensing if an action is to be taken in response to said interrupt, and if so attempting to take appropriate action, and if no action is to be taken;
   d. sensing if an action is to be taken for communicating with said file server, and if so, attempting to take appropriate action, and if no action is to be taken;
   e. sensing if a previously queued mailbox action is pending, and if so, checking to determine if said doorbell register is empty, and if so load said mailbox registers and said doorbell register, and if no action is pending;
   f. sensing if an interrupt has occurred on said fibre channel, and if yes, determining condition of said interrupt by said fibre channel and handling it by:
      i.) sensing whether or not said interrupt is a read type of operation, and if not a read type operation;
      ii.) determining unit number and status packet location;
      iii.) sensing if a status error is present, and if no error has occurred;
      iv.) setting flags to transfer status, and sense if available, to said file server memory; and,
   g. repeating steps a through f hereof.

7. A method as in claim 6 where a status error is present further including the step of storing said sense data for later transfer to said file server memory.

8. A method as in claim 6 where said interrupt is a read type of operation further including the steps of:

a. sensing if scatter/gather has been obtained, and if yes;

b. setting up a DMA transfer from said apparatus buffer memory to said file server memory sense and status data; and, c. starting said DMA transfer.

9. In a file server having a peripheral storage subsystem coupled thereto by means of a fibre channel, said file server including a memory and an apparatus disposed between said file server and said storage subsystem for adapting fibre channel transmissions to and from an industry standard data bus of said file server, said apparatus including an interface logic having a doorbell register and mailbox registers, a buffer memory, a fibre channel controller and a microprocessor executing a method comprising the steps of:

a. sensing if an interrupt has occurred by said file server, and if so, determining condition of said interrupt by said file server and handling it, and if no interrupt has occurred;

b. testing an interface between said fibre channel and said apparatus to assure connectivity of said fibre channel by:

i.) determining if a heartbeat counter has expired, and if yes;

ii.) blinking a heartbeat indicator;

iii.) sensing if said fibre channel has been broken since last pass of the steps hereof, and if yes;

iv.) attempting to re-establish said fibre channel connection;

v.) sensing if said fibre channel controller has stopped on an error, and if yes;

vi.) attempting to put said fibre channel controller back to an operation state;

c. sensing if an action is to be taken in response to said interrupt, and if so attempting to take appropriate action, and if no interrupt has occurred;

d. sensing if an action is to be taken for communicating with said file server, and if so, attempting to take appropriate action, and if no action is to be taken;

e. sensing if a previously queued mailbox action is pending, and if so, checking to determine if said doorbell register is empty, and if so load said mailbox registers and doorbell register, and if not pending;

f. sensing if an interrupt has occurred on said fibre channel, and if yes, determining condition of said interrupt by said fibre channel and handling it; and, g. repeating steps a through f hereof.

10. A method as in claim 9 where said heartbeat counter has not expired, continuing with the steps of claim 1.

11. A method as in claim 9 where said fibre channel loop has not been broken since last pass of the steps in claim 1, continuing with the steps of claim 1.

12. A method as in claim 9 where said fibre channel controller has not stopped on an error, continuing with the steps of claim 1.

13. In a file server having a peripheral storage subsystem coupled thereto by means of a fibre channel, said file server including a memory and an apparatus disposed between said file server and said storage subsystem for adapting fibre channel transmissions to and from an industry standard data bus of said file server, said apparatus including an interface logic having a doorbell register and mailbox registers, a buffer memory, a fibre channel controller and a microprocessor executing a method comprising the steps of:

a. sensing if an interrupt has occurred by said file server, and if so, determining condition of said interrupt by said file server and handling it by:

i) sensing if a DMA transfer is complete, and if yes;

ii) sensing if write data transfer is complete, and if yes, setting flags to start command transfer to said fibre channel;

iii) if said write is not complete, sensing if read is complete and if not;

iv) sensing if status has been sent with data, and if yes;

v) setting unit number and return a Command Control Block ("CCB") address to mailbox registers of said apparatus;

vi) completing command by setting doorbell registers of said apparatus;

and if no action is pending.

b. testing an interface between said fibre channel and said apparatus to assure connectivity of said fibre channel;

c. sensing if an action is to be taken in response to said interrupt, and if so attempting to take appropriate action by:

i.) determining type of SCSI command;

ii.) setting up command structures;

iii.) starting transfer of command to one of said disk drives; and, iv.) idling until a command completion interrupt is received, and if no action is to be taken;

d. sensing if an action is to be taken for communicating with said file server, and if so, attempting to take appropriate action, and if no action is to be taken;

e. sensing if a previously queued mailbox action is pending, and if so, checking to determine if said doorbell register is empty, and if empty load said mailbox registers and said doorbell register, and if not pending;

f. sensing if an interrupt has occurred on said fibre channel, and if yes, determining condition of said interrupt by said fibre channel and handling it; and, g. repeating steps a through f hereof.

14. A method as in claim 13 where DMA transfer is not complete, further including the steps of:

a. sensing if said interrupt is by said file server, and if yes;

b. reading said mailbox registers to determine if an action is pending;

c. determining operation type and using said CCB address to obtain said CCB from said file server memory;

d. validating said CCB and determining SCSI operation type from contents of said CCB;

e. setting appropriate flags and registers;

f. sensing if this is a write type of operation, and if not, setting flags to start command transfer to said fibre channel;

g. if this is a write type of operation, determining if a scatter/gather list for this action has been obtained, and if so;

h. setting up a DMA transfer from said file server memory to said buffer memory of said apparatus; and, i. starting said DMA.

15. In a file server having a peripheral storage subsystem coupled thereto by means of a fibre channel, said file server including a memory and an apparatus disposed between said file server and said storage subsystem for adapting fibre channel transmissions to and from an industry standard data bus of said file server, said apparatus including an interface logic having a doorbell register and mailbox registers, a buffer memory, a fibre channel controller and a microprocessor executing a method comprising the steps of:

a. sensing if an interrupt has occurred by said file server, and if so, determining condition of said interrupt by said file server and handling it, and if no interrupt has occurred;

b. testing an interface between said fibre channel and said apparatus to assure connectivity of said fibre channel by:
   i) determining if a heartbeat counter has expired, and if yes;
   ii) blinking a heartbeat indicator;
   iii) sensing if said fibre channel has been broken since last pass hereof the steps of, and if yes;
   iv) attempting to re-establish said fibre channel connection;
   v) sensing if said fibre channel controller has stopped on an error, and if yes;
   vi) attempting to put said fibre channel controller back to an operation state; and,
   vii) continuing with the steps;

c. sensing if an action is to be taken in response to said interrupt, and if so attempting to take appropriate action, and if not;

d. sensing if an action is to be taken for communicating with said file server, and if so, attempting to take appropriate action, and if not;

e. sensing if a previously queued mailbox action is pending, and if so, checking to determine if said doorbell register is empty, and if empty load said mailbox registers and said doorbell register, and if not pending;

f. sensing if an interrupt has occurred on said fibre channel, and if yes, determining condition of said interrupt by said fibre channel and handling it; and, g. repeating steps a through f hereof.

16. A method as in claim 15 where said heartbeat counter has not expired, continuing with the steps of claim 1.

17. A method as in claim 15 where said fibre channel loop has not been broken since last pass of the steps in claim 1, continuing with the steps of claim 1.

18. A method as in claim 15 where said fibre channel controller has not stopped on an error, continuing with the steps of claim 1.

* * * * *